US008886446B1

(12) United States Patent
Baiada et al.

(10) Patent No.: US 8,886,446 B1
(45) Date of Patent: Nov. 11, 2014

(54) METHOD AND SYSTEM FOR ALLOCATING AIRCRAFT ARRIVAL/DEPARTURE SLOT TIMES, WITH PREFERRED MOVEMENT

(71) Applicants: Rade Michael Baiada, Evergreen, CO (US); Lonnie Howard Bowlin, Owings, MD (US)

(72) Inventors: Rade Michael Baiada, Evergreen, CO (US); Lonnie Howard Bowlin, Owings, MD (US)

( * ) Notice: Subject to any disclaimer, the term of this patent is extended or adjusted under 35 U.S.C. 154(b) by 64 days.

(21) Appl. No.: 13/893,595

(22) Filed: May 14, 2013

Related U.S. Application Data

(60) Provisional application No. 61/688,575, filed on May 14, 2012.

(51) Int. Cl.
*G08G 5/02* (2006.01)
*G01C 21/34* (2006.01)

(52) U.S. Cl.
USPC ............. 701/122; 701/120; 244/75.1; 342/29

(58) Field of Classification Search
CPC ....... G08G 5/02; G08G 5/0117; G08G 5/003; G08G 5/0034; G10C 21/34; G10C 32/3438; G05D 1/00
USPC ........ 701/120, 122, 3, 301; 244/75.1; 342/29; 340/945
See application file for complete search history.

(56) References Cited

U.S. PATENT DOCUMENTS

| 6,278,965 B1 * | 8/2001 | Glass et al. ...................... 703/22 |
| 6,314,362 B1 * | 11/2001 | Erzberger et al. ............. 701/120 |
| 7,228,207 B2 * | 6/2007 | Clarke et al. ...................... 701/3 |

* cited by examiner

*Primary Examiner* — Tan Q Nguyen

(57) ABSTRACT

The present invention takes the form of a computer program, method and/or system to allow an airline, aviation authority or other aviation entity to temporally manage, coordinate and allocate aircraft arrival/departure Slot Times during a specified period for the flow of a plurality of aircraft at a specified fix point, based upon specified data comprised of the aircraft, the fix point, associated system resources, business/operational goals, airline Requested Slot Times, Preferred Movement and aviation system specified criteria, some of which is temporally varying.

30 Claims, 24 Drawing Sheets

Sample of the Method's Processing Sequence

Sample Process to Coordinate Arrival Fix Times by Multiple System Operators.

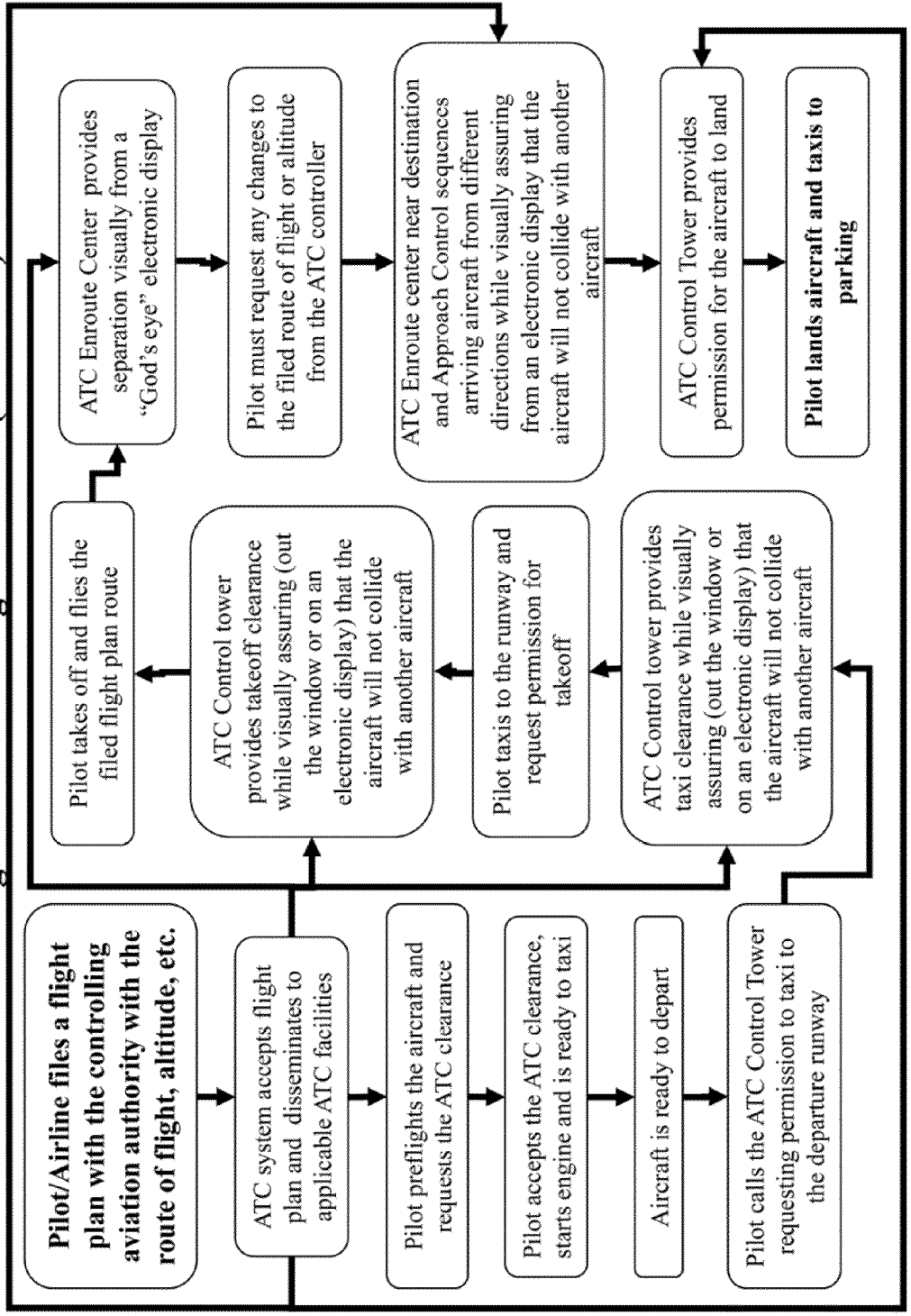

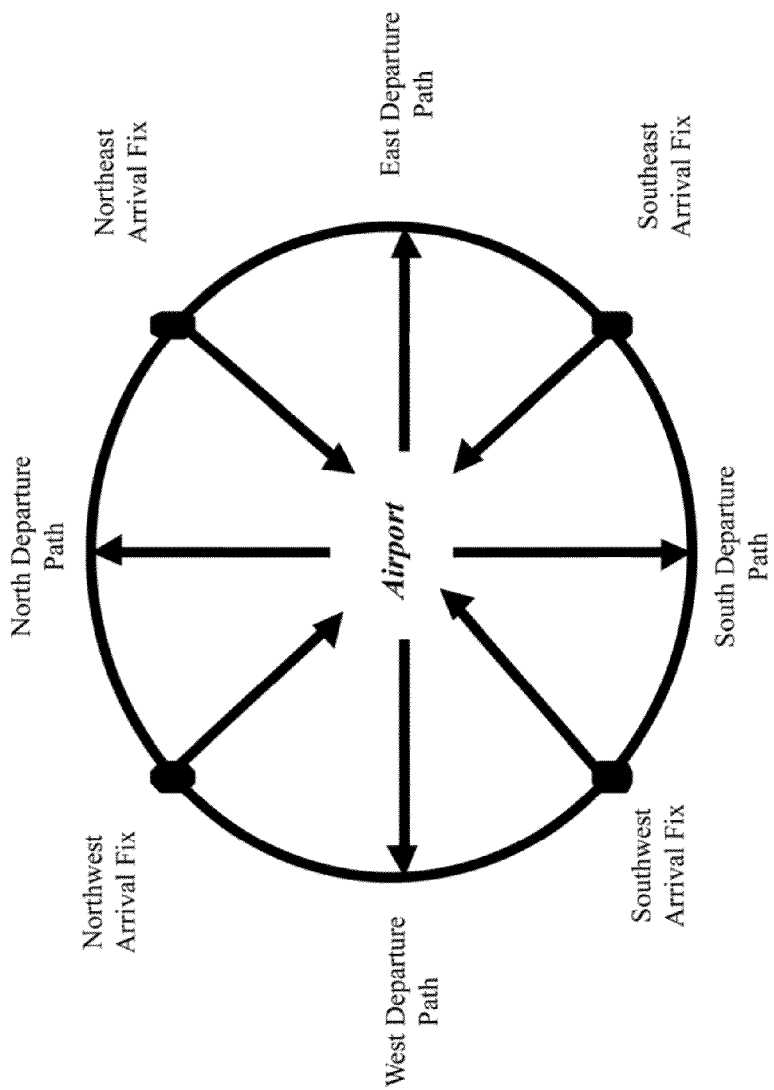
Fig. 2- Airport Arrival/Departure Flow (Prior Art)

Fig. 3 - DFW CTAS Data, 2200 TO 2230 CMT Arrivals – 11/6/98 (Prior Art)

| # | Flight | Dest | Rwy | Time | # | Flight | Dest | Rwy | Time | # | Flight | Dest | Rwy | Time |
|---|---|---|---|---|---|---|---|---|---|---|---|---|---|---|
| 1. | AAL458 | SJC | 18R | 2201 | 19. | EGF718 | MAF | 13R | 2208 | 36. | USA777 | PIT | 18R | 2218 |
| 2. | EGF026 | MEM | 17L | 2201 | 20. | AAL656 | ABQ | 18R | 2209 | 37. | AAL1016 | SAN | 17C | 2219 |
| 3. | AAL1707 | TPA | 17C | 2201 | 21. | EGF114 | LCH | 17L | 2209 | 38. | AAL1280 | LGB | 18R | 2219 |
| 4. | EGF202 | SHV | 17L | 2202 | 22. | AAL2161 | EWR | 17C | 2209 | 39. | AAL1884 | SAT | 17C | 2220 |
| 5. | EGF784 | ACT | 13R | 2202 | 23. | EGF621 | HOU | 17L | 2210 | | | | | |
| 6. | TWA453 | STL | 18R | 2202 | 24. | EGF704 | XNA | 17C | 2210 | 40. | AAL794 | SEA | 13R | 2221 |
| 7. | EGF736 | TUL | 17L | 2203 | 25. | AAL1188 | ONT | 13R | 2210 | 41. | AMT255 | MDW | 18R | 2221 |
| 8. | AAL1498 | SNA | 18R | 2203 | | | | | | 42. | AAL48 | PHX | 13R | 2222 |
| 9. | AAL2038 | IAH | 17C | 2203 | 26. | AAL50 | DEN | 18R | 2211 | 43. | AAL564 | ICT | 17C | 2222 |
| 10. | AAL79 | EGK | 17C | 2204 | 27. | AAL1714 | LAS | 13R | 2212 | 44. | AAL496 | TUS | 18R | 2223 |
| 11. | EGF650 | LIT | 17L | 2204 | 28. | AAL839 | MSY | 17C | 2213 | 45. | AAL9649 | MCO | 17C | 2223 |
| 12. | AWE544 | PHX | 18R | 2205 | 29. | AAL1412 | ELP | 18R | 2214 | | | | | |
| | | | | | 30. | AAL1720 | OKC | 13R | 2214 | 46. | AAL1552 | SFO | 18R | 2226 |
| 13. | EGF854 | TYR | 17L | 2206 | 31. | AAL1306 | SLC | 13R | 2215 | 47. | AAL1890 | LAX | 17C | 2226 |
| 14. | KHA200 | FTW | 13R | 2206 | | | | | | 48. | UAL478 | SFO | 18R | 2228 |
| 15. | DAL237 | ATL | 18R | 2207 | 32. | AAL2233 | ORD | 17C | 2216 | 49. | UAL1055 | ORD | 18R | 2229 |
| 16. | EGF094 | GGG | 17L | 2207 | 33. | COA186 | IAH | 18R | 2217 | 50. | AAL1978 | AUS | 17C | 2230 |
| 17. | AAL1779 | LIT | 17C | 2207 | 34. | AAL1404 | COS | 17C | 2217 | | | | | |
| 18. | EGF128 | TXK | 17C | 2208 | 35. | AAL742 | MCI | 13R | 2218 | | | | | |

Fig. 4 - December 2000 DOT Data (Prior Art)

```
DECEMBER 2000 AIR TRAVEL CONSUMER REPORT
TABLE 3. PERCENTAGE OF ALL CARRIERS' REPORTED FLIGHT OPERATIONS ARRIVING ON TIME
BY AIRPORT AND TIME OF DAY (REPORTABLE AIRPORTS ONLY)
```

| ARRIVAL AIRPORT SCHEDULED ARRIVAL TIME | ATL | BOS | BWI | CLT | CVG | DCA | DEN | DFW | DTW | EWR | IAH | JFK | LAS |
|---|---|---|---|---|---|---|---|---|---|---|---|---|---|
| 600 - 659 AM | 80.4 | 72.7 | 71.0 | 91.3 | 66.7 | 50.0 | 72.4 | 75.1 | 63.7 | 71.0 | 90.4 | 72.8 | 90.7 |
| 700 - 759 AM | 71.5 | 71.1 | 84.0 | 81.5 | 68.6 | 70.8 | 71.9 | 80.5 | 68.6 | 72.0 | 84.6 | 65.6 | 92.3 |
| 800 - 859 AM | 62.7 | 68.3 | 84.6 | 71.7 | 75.7 | 81.5 | 74.5 | 68.3 | 64.1 | 73.3 | 80.2 | 80.6 | 76.7 |
| 1000 - 1059 AM | 60.4 | 67.9 | 75.5 | 66.1 | 73.8 | 68.6 | 65.1 | 72.1 | 67.0 | 74.0 | 77.4 | 78.0 | 61.3 |
| 1100 - 1159 AM | 61.3 | 70.0 | 78.7 | 75.1 | 59.7 | 71.8 | 72.7 | 70.5 | 63.7 | 72.7 | 70.6 | 3/ | 68.1 |
| 1200 - 1259 PM | 60.3 | 68.9 | 79.2 | 65.2 | 61.3 | 68.0 | 62.7 | 71.9 | 66.7 | 67.8 | 82.5 | 3/ | 64.0 |
| 100 - 159 PM | 52.9 | 70.2 | 68.5 | 75.0 | 73.3 | 71.4 | 62.8 | 74.3 | 59.6 | 66.8 | 75.2 | 72.9 | 63.9 |
| 200 - 259 PM | 56.6 | 67.6 | 71.2 | 70.5 | 71.0 | 71.7 | 68.4 | 63.6 | 55.4 | 67.3 | 74.4 | 67.6 | 65.1 |
| 300 - 359 PM | 55.5 | 62.1 | 69.4 | 67.1 | 65.2 | 76.3 | 67.5 | 70.9 | 59.1 | 67.6 | 72.2 | 76.6 | 65.7 |
| 400 - 459 PM | 54.0 | 65.9 | 68.2 | 64.7 | 58.0 | 69.6 | 58.3 | 68.4 | 60.3 | 66.2 | 74.6 | 69.9 | 61.6 |
| 500 - 559 PM | 50.6 | 60.4 | 68.1 | 71.7 | 60.5 | 63.0 | 62.7 | 57.4 | 56.0 | 60.3 | 69.1 | 71.6 | 55.9 |
| 600 - 659 PM | 52.8 | 60.4 | 65.4 | 63.5 | 60.2 | 65.9 | 53.6 | 62.6 | 54.0 | 61.1 | 69.1 | 59.2 | 63.6 |
| 700 - 759 PM | 44.7 | 64.7 | 59.6 | 66.5 | 59.9 | 67.4 | 54.3 | 66.2 | 56.6 | 63.1 | 74.0 | 58.2 | 57.2 |
| 800 - 859 PM | 49.3 | 60.0 | 58.5 | 58.1 | 56.7 | 68.9 | 61.6 | 55.5 | 49.7 | 65.5 | 67.1 | 59.6 | 57.8 |
| 900 - 959 PM | 48.7 | 59.6 | 65.4 | 71.3 | 61.9 | 60.0 | 61.9 | 62.9 | 60.3 | 66.3 | 64.7 | 68.9 | 60.1 |
| 1000 - 1059 PM | 53.8 | 63.0 | 63.4 | 50.0 | 38.3 | 68.1 | 59.5 | 57.1 | 53.9 | 60.8 | 54.9 | 64.9 | 60.9 |
| 1100 - 559 AM | 57.7 | 62.1 | 63.7 | 65.7 | 55.7 | 55.4 | 59.9 | 65.5 | 56.9 | 70.7 | 62.8 | 68.1 | 61.9 |
| TOTAL by Airport | 56.9 | 65.0 | 69.8 | 70.1 | 64.5 | 69.1 | 64.1 | 67.1 | 59.9 | 67.0 | 73.7 | 68.2 | 64.6 |

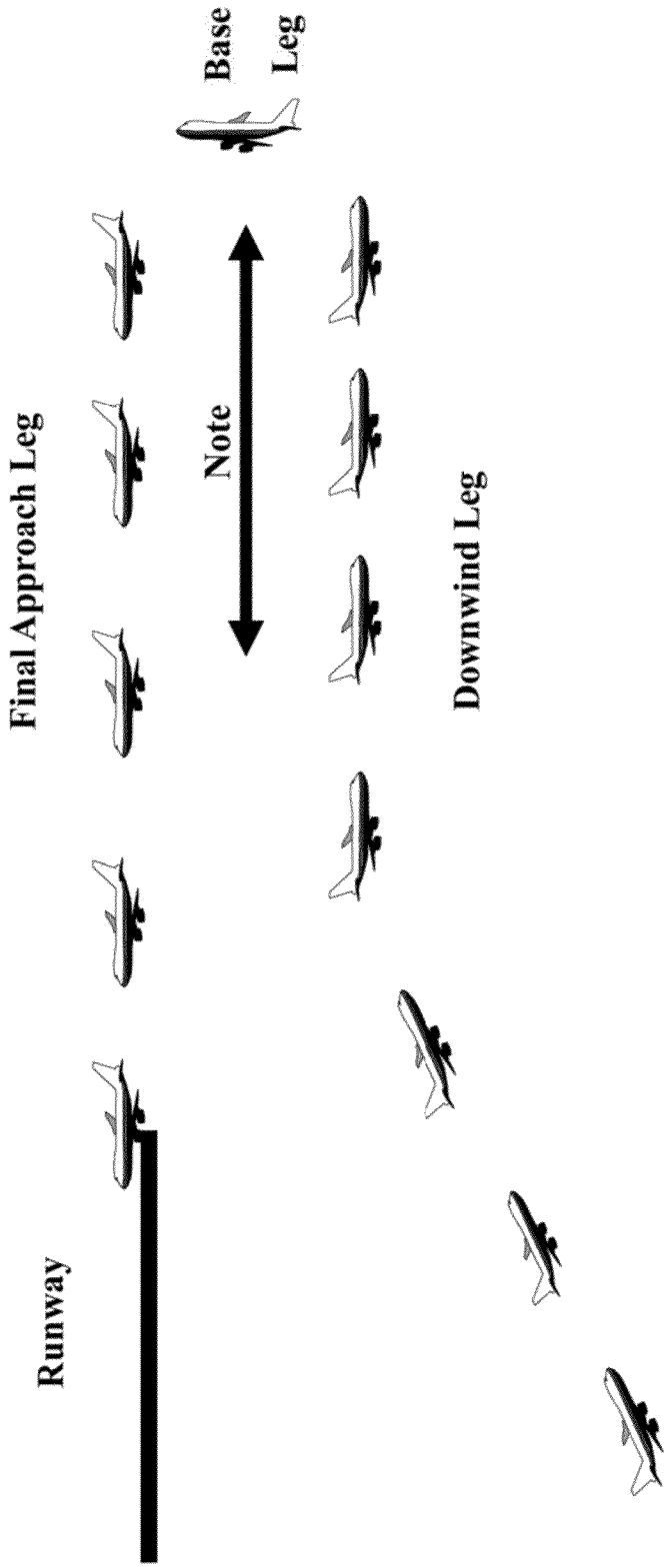

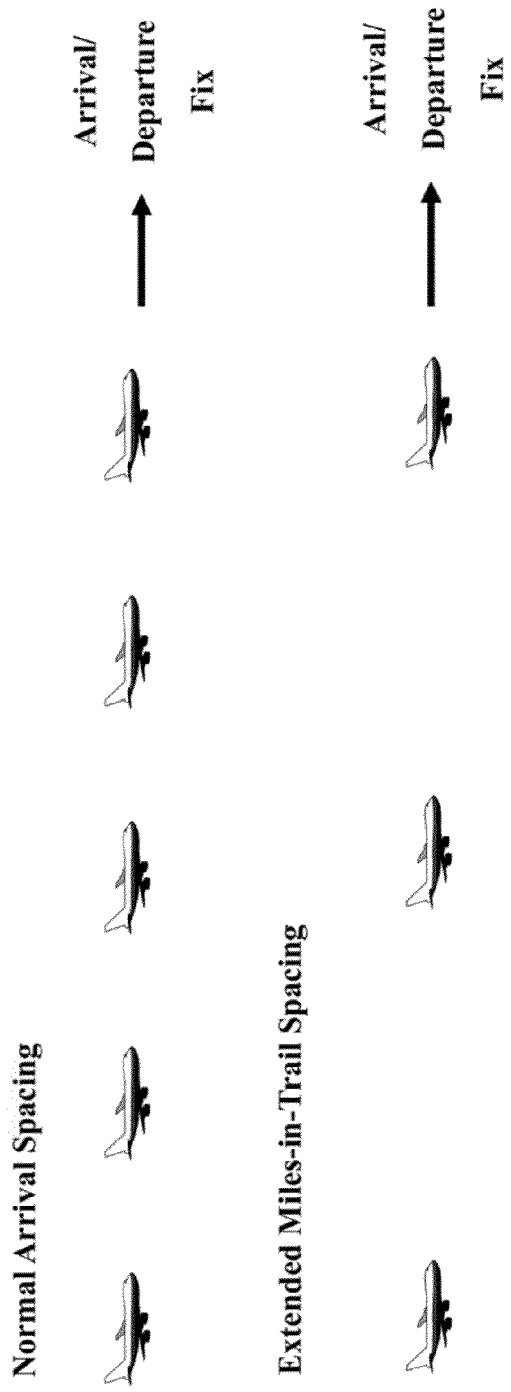

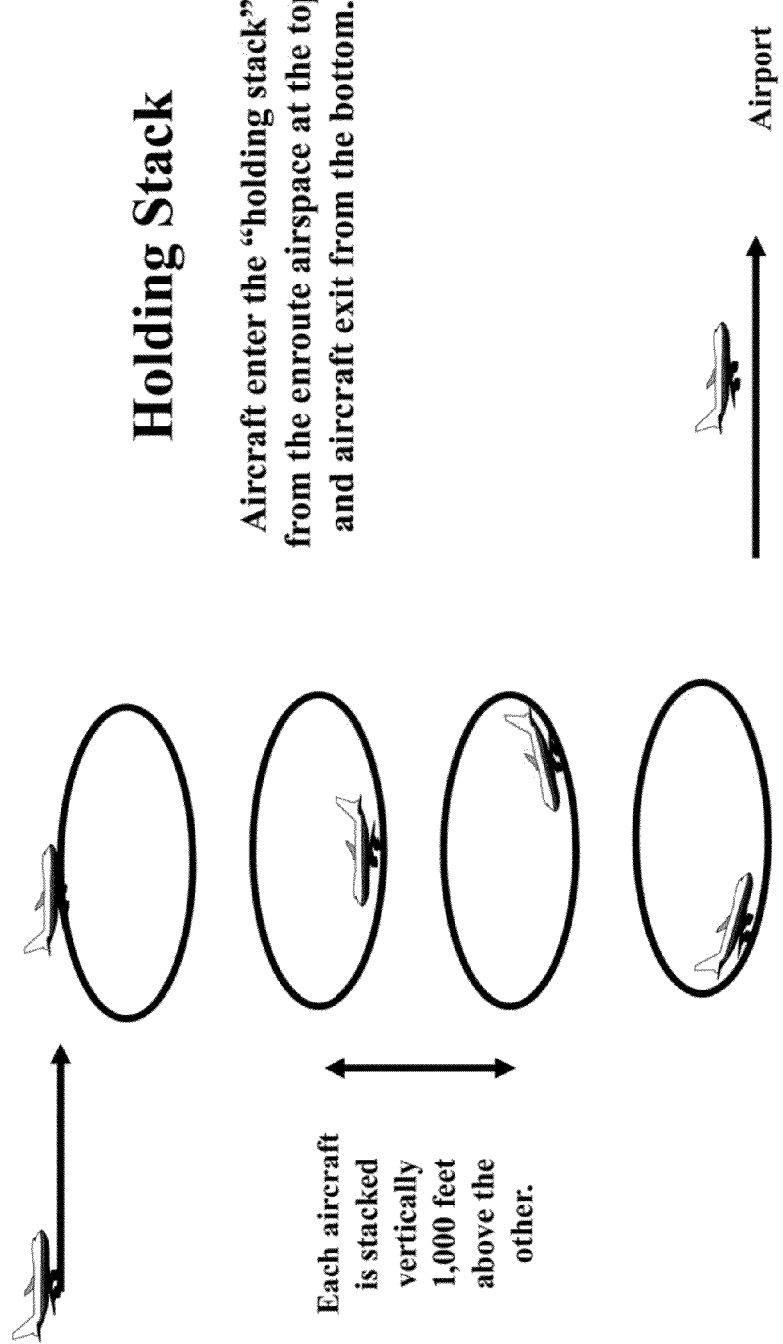
Fig. 7 - Airborne Holding (Prior Art)

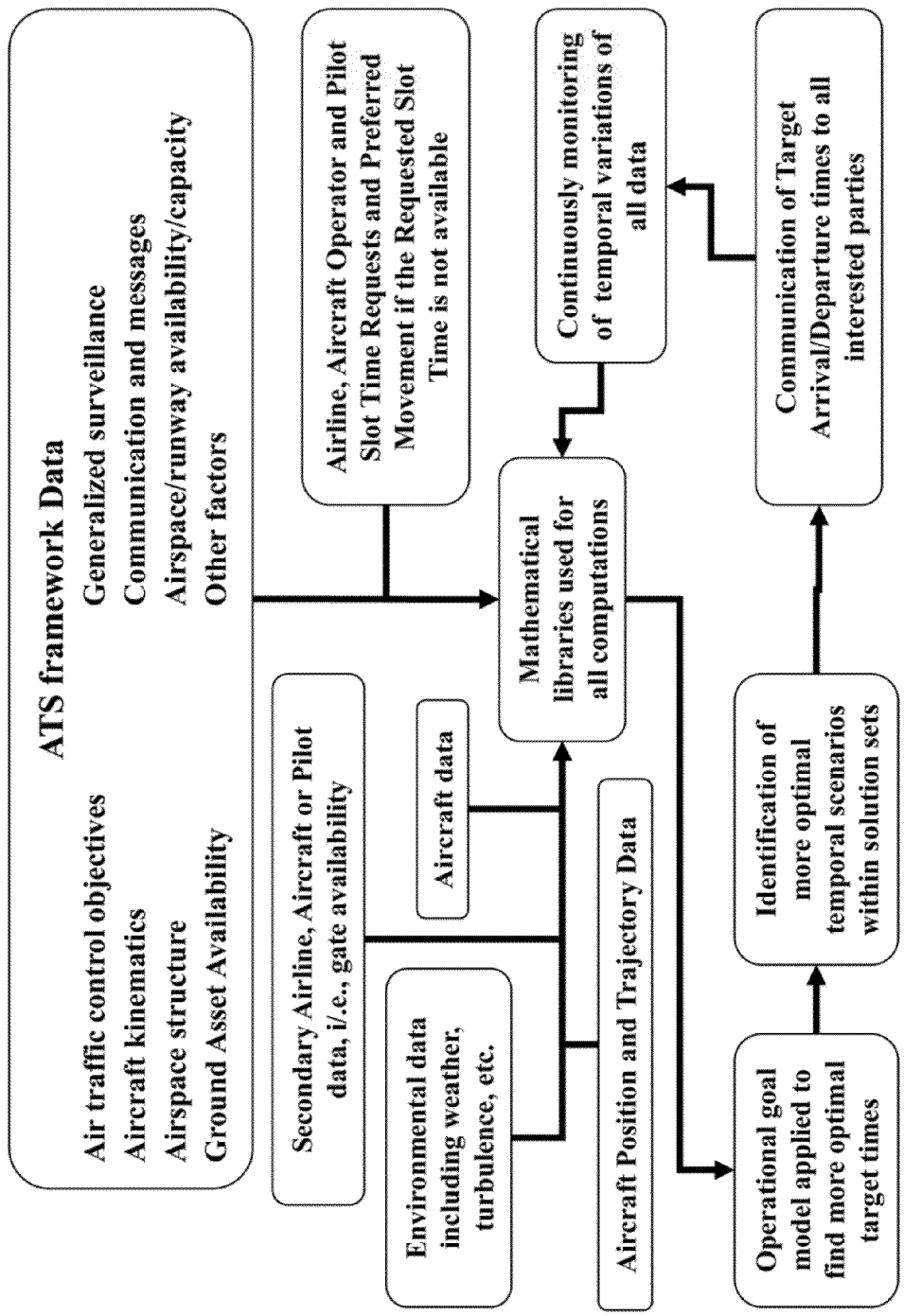
Fig. 8 - Data Sets

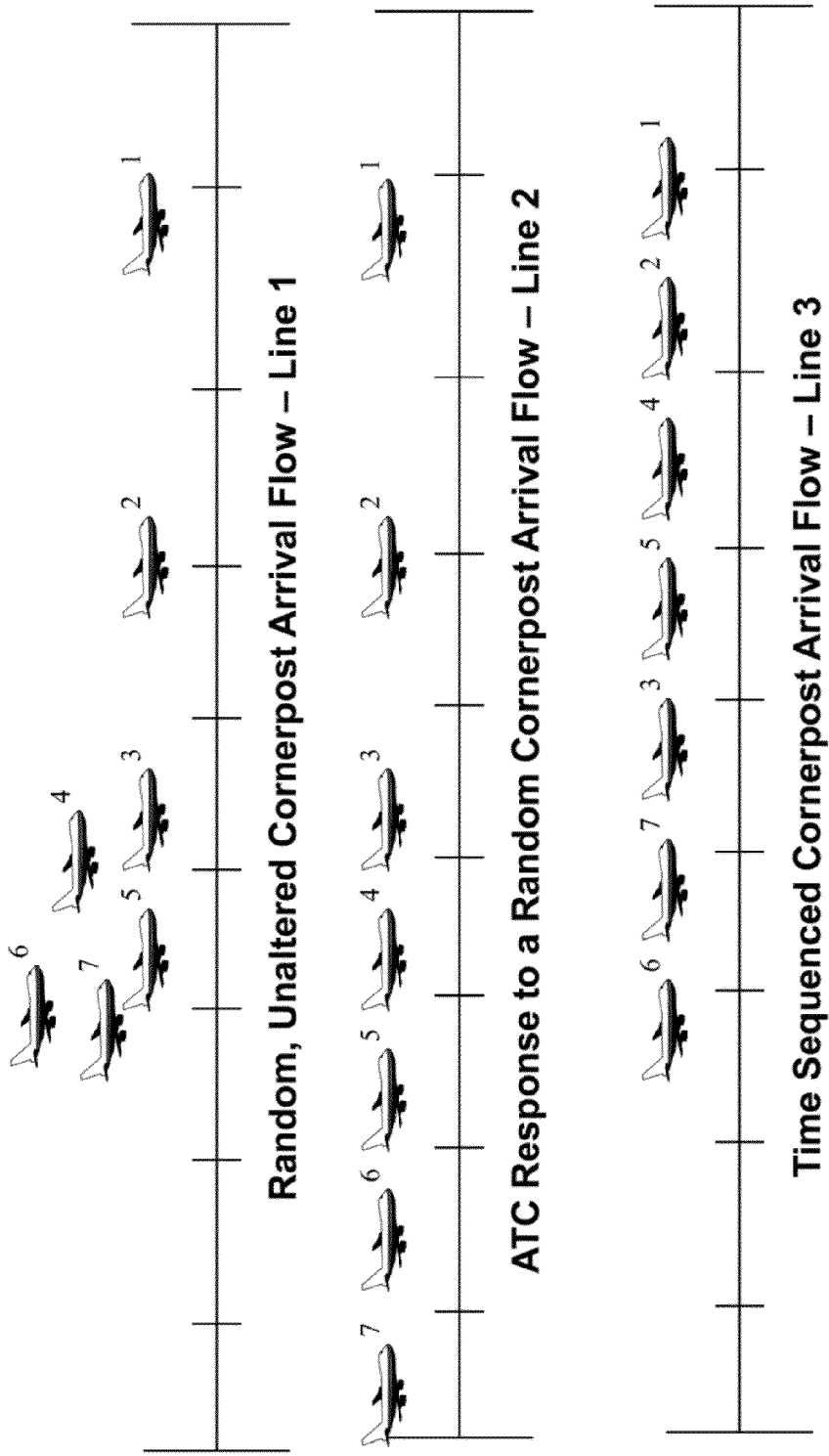

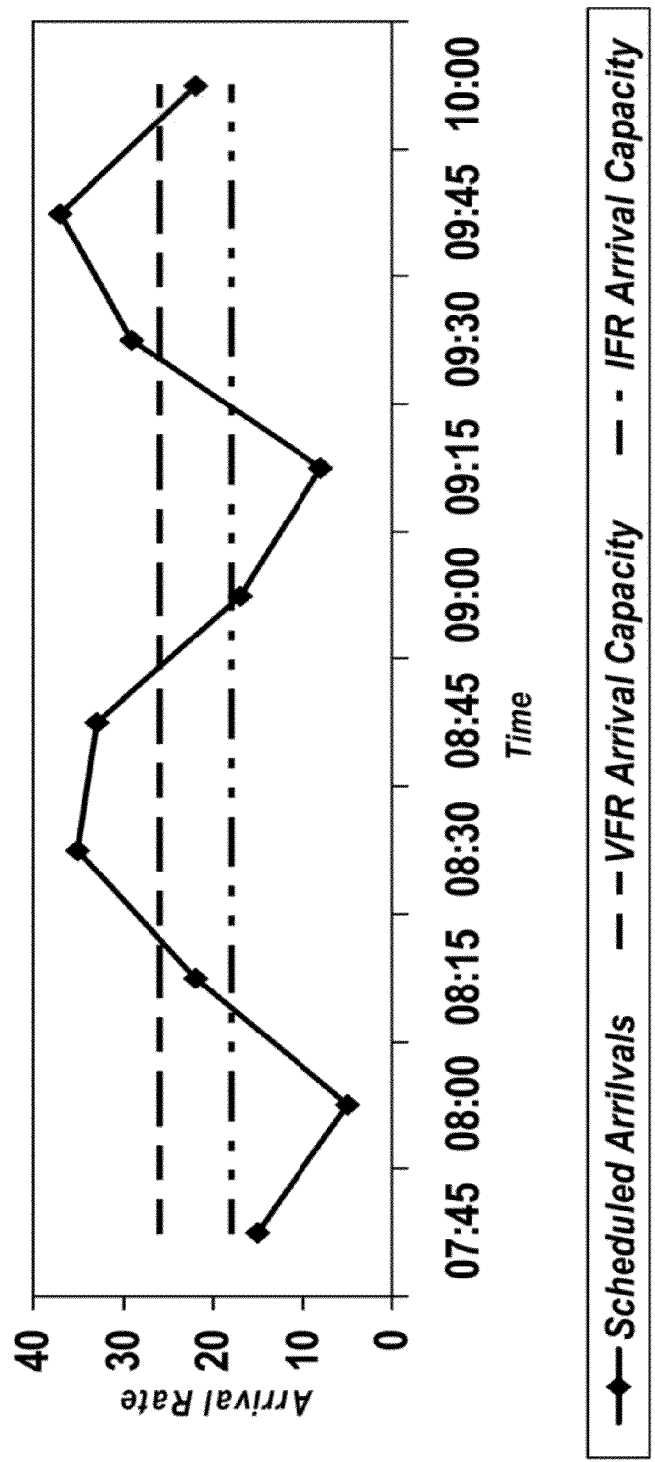
Fig. 10 - Typical Hub Arrival Schedules versus Capacity Shown In 15 Minute Blocks

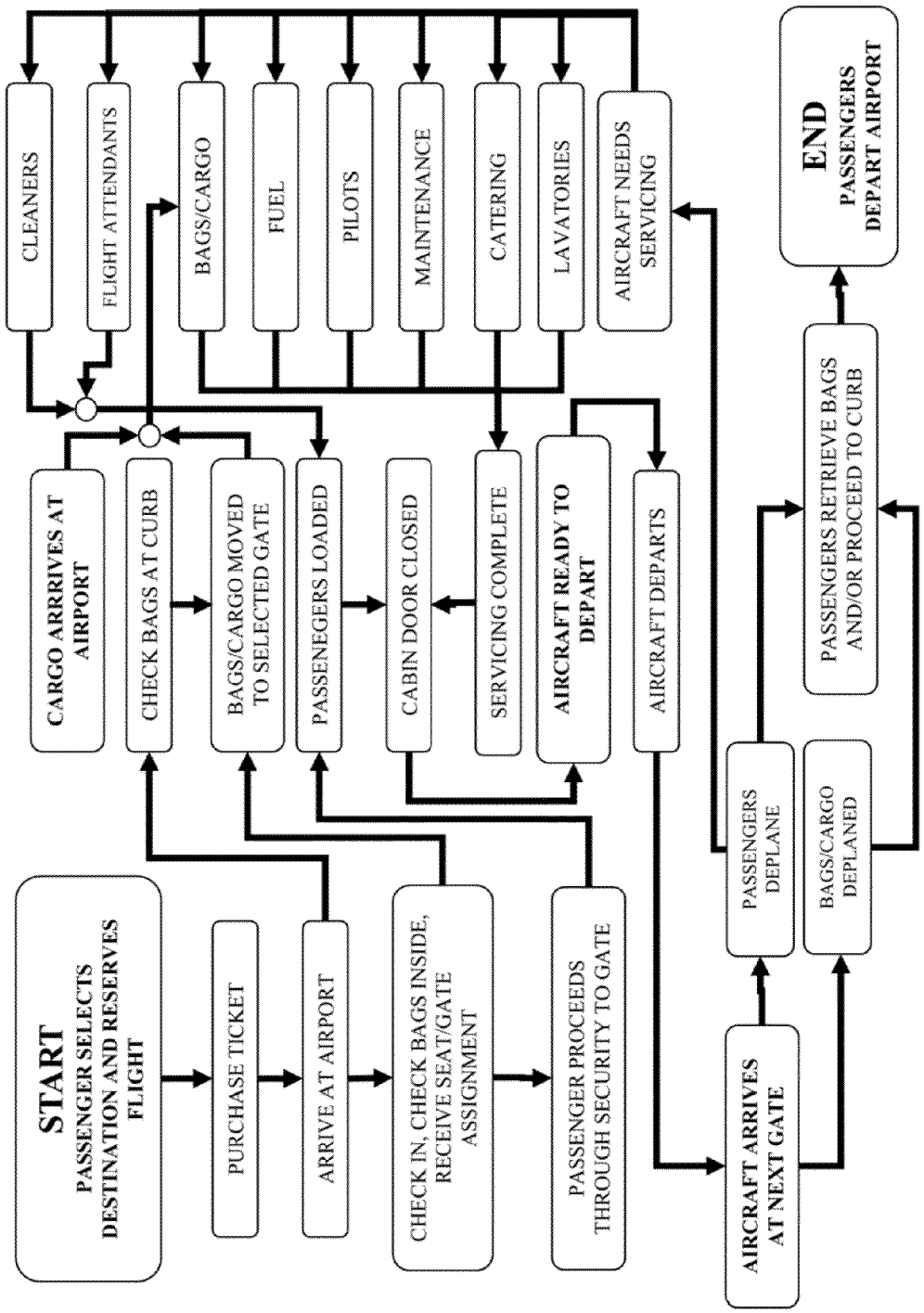
Fig. 11 – Typical Airline Production Process

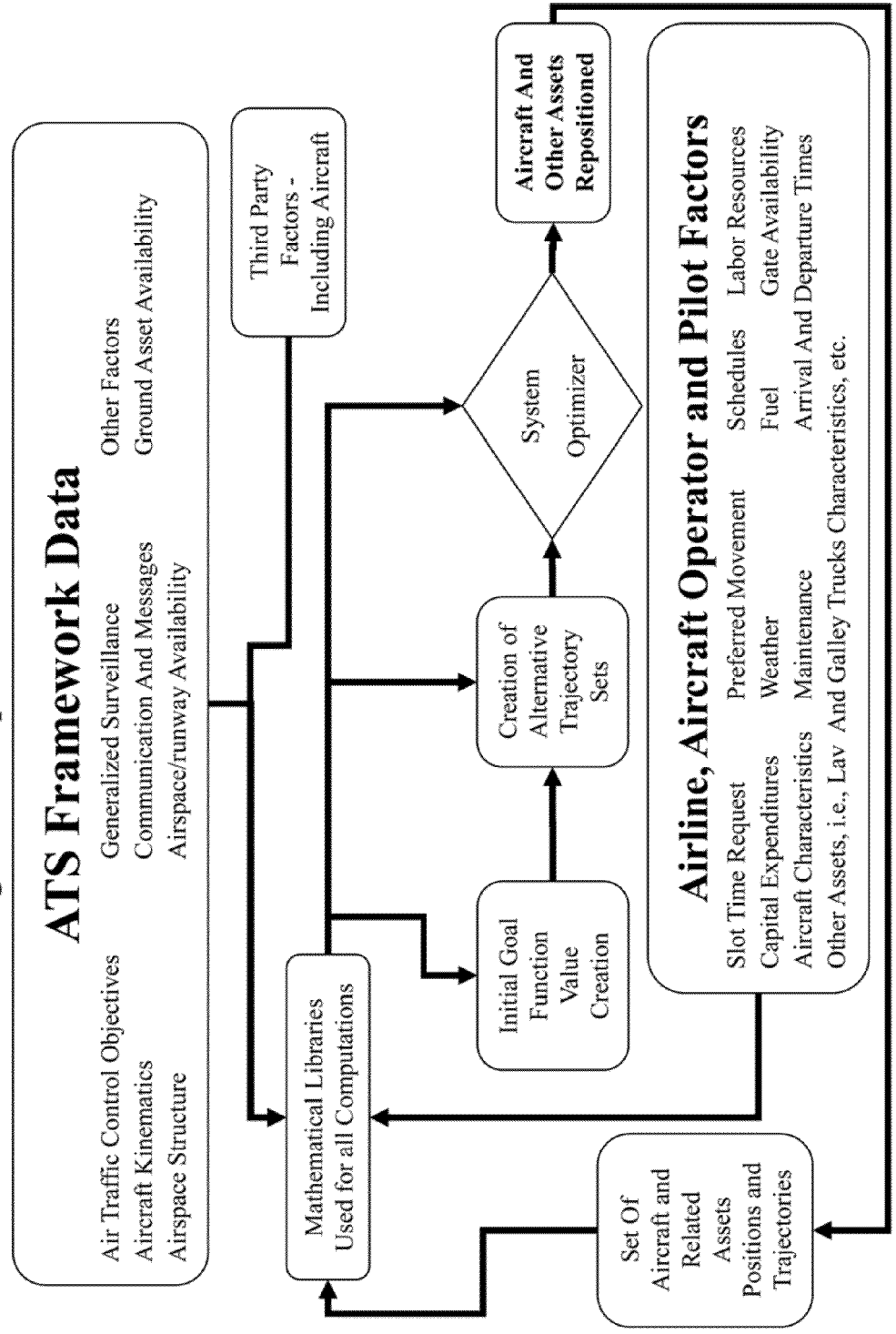
Fig. 12 – Sample Data Sets and Data Flow

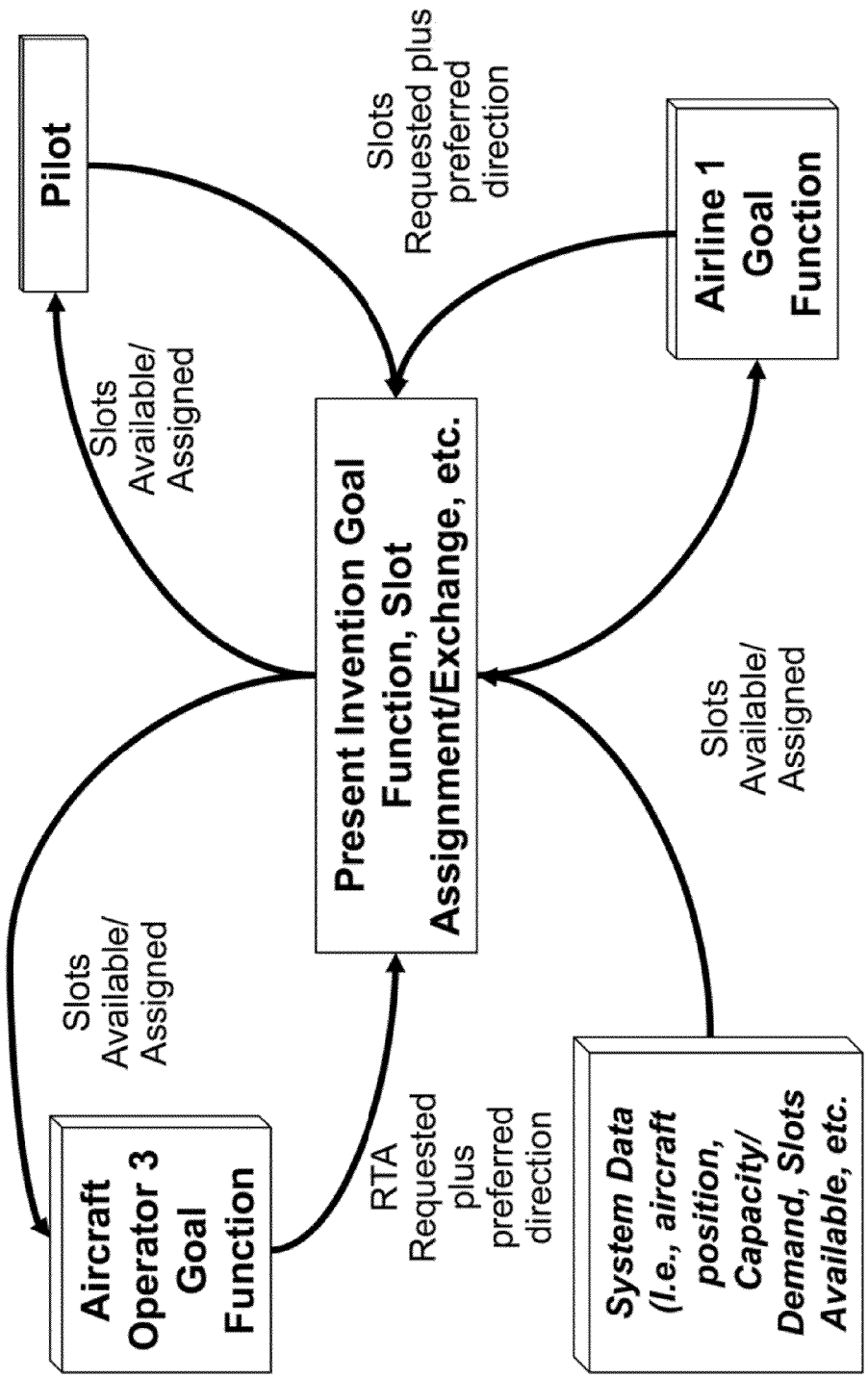
Fig. 13 – Sample Process to Coordinate Arrival Fix Times by Multiple System Operators.

Fig 14a – Decision/Command Matrix

Critical Factors:

1. What is the optimum airport arrival time for each aircraft as determined by the airline/user/pilot?
2. What can the individual airlines do to meet the needs of all of the aircraft approaching the airport?
3. Is the airspace infrastructure (runways, airspace, arrival fix) capable of meeting the aircraft needs taking into account available assets and the needs of all of the other aircraft?
4. What time are the control actions taken? [Note: the future trajectory prediction of all of the assets is an important aspect of this decision]
5. Decisions 1 and 2 are made by the user and passed to the Aviation Authority (if this is the operator) for integration to the present invention. Absence any information to from the airline/user/pilot, the present invention works towards safety, operational and efficiency goals.

Fig. 14b - Decision/Command Matrix
Decision 1 - Intra-Aircraft Decisions

Focus - Aircraft and User Needs and Wants

What does the individual aircraft need and/or want?
Arrival at airport at OAG Scheduled Arrival Time
Evaluate future trajectories for needs (Look Ahead)
Enough airport Time to:
- Get Passengers off/on
- Get Baggage off/on
- Get Cargo off/on
- Complete Aircraft Servicing (lavs, food, etc.)
- Complete required maintenance items
- Depart on time for next segment
Enough connection time for passengers Maintenance Actions
- Scheduled maintenance
- Unscheduled repairs
- Deicing
- Known repairs
Shorter route
Comfortable ride
Use Minimum Fuel
A gate upon arrival
Crew (Pilots and Flight Attendants)

Key Questions
What services does aircraft need? Regular or special?
What time does aircraft want to arrive in a perfect world?

Aircraft Characteristics
Safe Speed Range
Fuel Burn Model (fuel available to make desired change)
Wind Model
Altitude Capability (aircraft weight)

Enroute Weather Model
Enroute Turbulence Model
Aircraft position data
Fuel Burn Model (minimum fuel usage)

Fig. 14c - Decision/Command Matrix
Decision 2 - Intra-Airline Decisions

Focus - Airline Capabilities to meet needs of all aircraft

Can the airline meet the aircraft's needs?
- Gate Availability
- Jetway or Stair Availability
- Baggage Crew Availability
- Fueling Availability
- Flow of Passenger Connecting Flights
- Mechanic Availability
- Dynamic Gate Management
- Asset Trajectory Matching
- Cleaning Crew Availability
- Agent Availability
- Galley Loading/Unloading
- Parts Availability

Key Questions
- What is the airline's ability to meet the needs of all aircraft?
- Will airline service capability delay aircraft?

Airline Data
- Airport data
- Fuel truck data
- Passenger data/model
- Mechanic data
- Crew data
- Customer Service Agent data
- Galley data
- Aircraft parts data

Fig. 14d - Decision/Command Matrix

Decision 3 - Aviation Authority Decisions

Focus - Infrastructure Capabilities to meet needs of all aircraft

Can the infrastructure meet the aircraft's needs?
- Airspace Availability
- Arrival Fix Availability
- Weather
- Airline/pilot requirements (Decision 1 and 2 data if available)
- Runway Availability
- Infrastructure Trajectory Matching Demand

Key Questions
- What is the aviation authority's ability to meet needs of all aircraft?
- Will infrastructure constraints delay aircraft?

Infrastructure Data
- Runway Acceptance Rate
- Weather
- Cornerpost Acceptance Rate
- Equipment Status

Fig. 14e – Decision/Command Matrix

Control Action 1 - Airline/Aviation Authority

Focus – How and When to Make Control Action Happen

Control Actions

Transmit fix crossing time to aircraft

Monitor actions to assure aircraft response meets the new assigned goals

Key Questions

What time should control action take place?

How should pilot be notified?

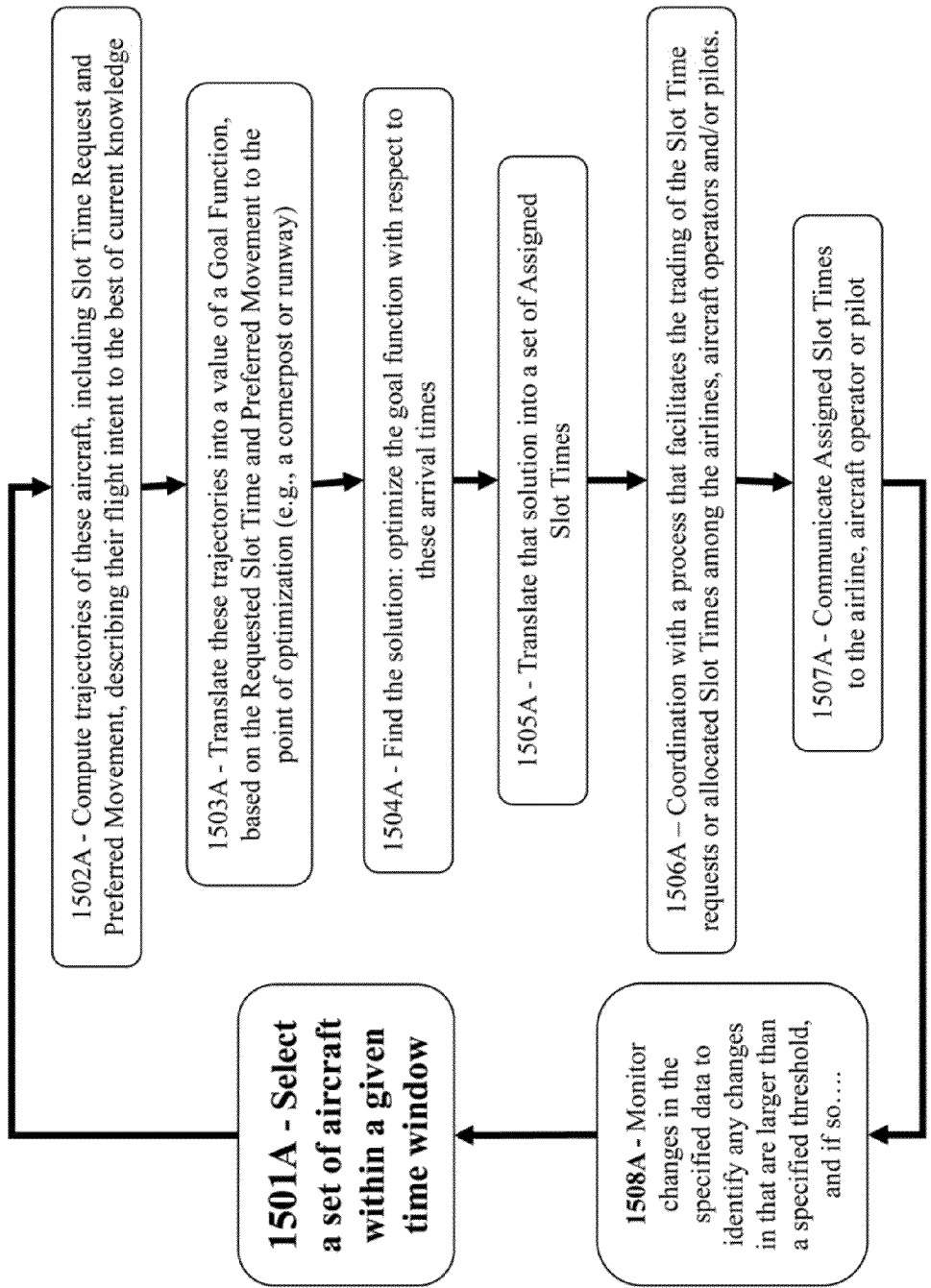
Fig. 15a - Sample of the Method's Processing Sequence

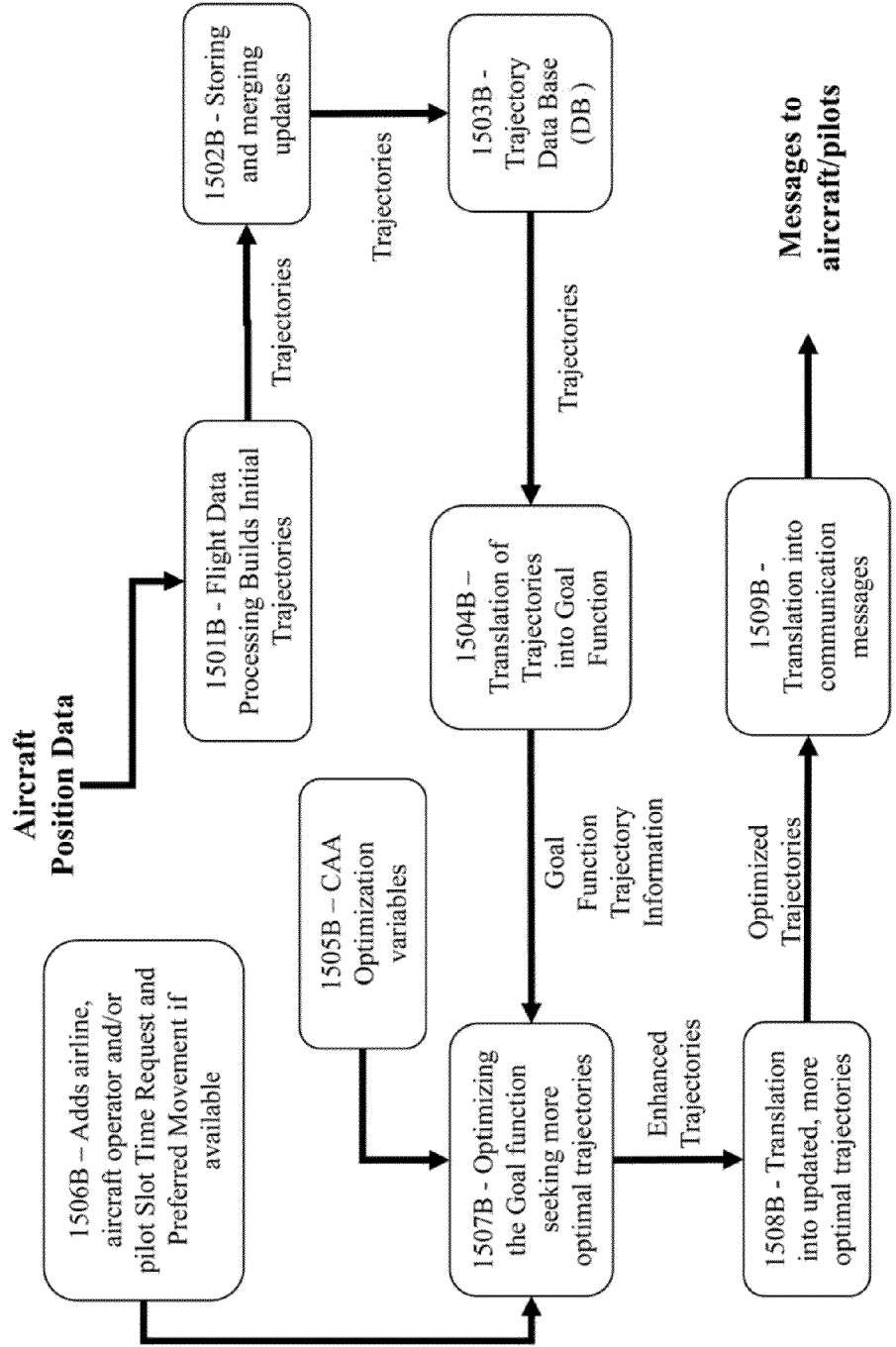
Fig. 15b - Sample of the Method's Processing Sequence

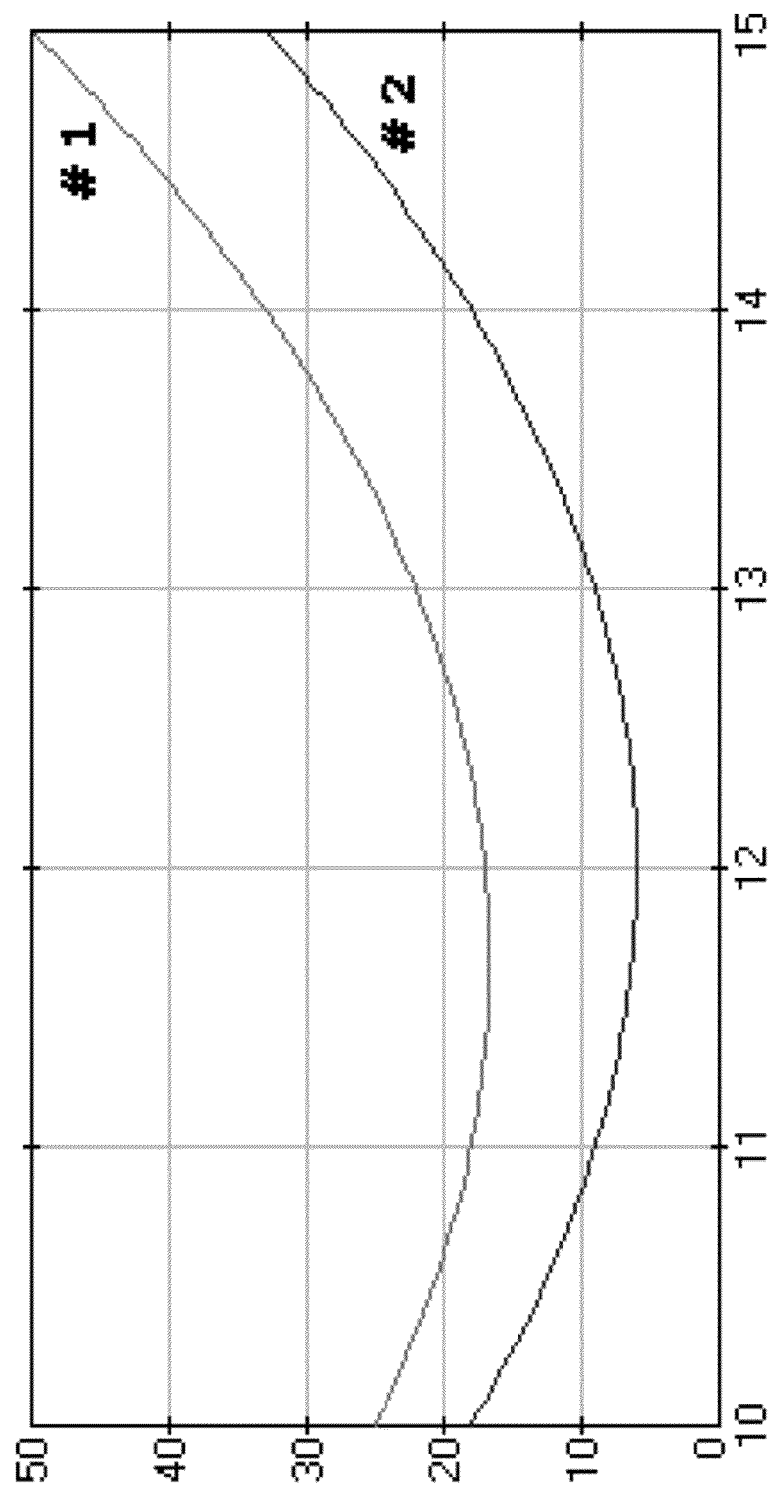
Fig. 16 – Single-aircraft Goal Function component for two aircraft (example)

Fig. 17 - Total Goal Function for a system of two aircraft (example)

|        | $t_2=10$ | $t_2=11$ | $t_2=12$ | $t_2=13$ | $t_2=14$ | $t_2=15$ |
|--------|------|------|------|------|------|------|
| $t_1=10$ | 1043 | 34   | 31   | 34   | 43   | 58   |
| $t_1=11$ | 36   | 1027 | 24   | 27   | 36   | 51   |
| $t_1=12$ | 35   | 26   | 1023 | 26   | 35   | 50   |
| $t_1=13$ | 40   | 31   | 28   | 1031 | 40   | 55   |
| $t_1=14$ | 51   | 42   | 39   | 42   | 1051 | 66   |
| $t_1=15$ | 68   | 59   | 56   | 59   | 68   | 1083 |

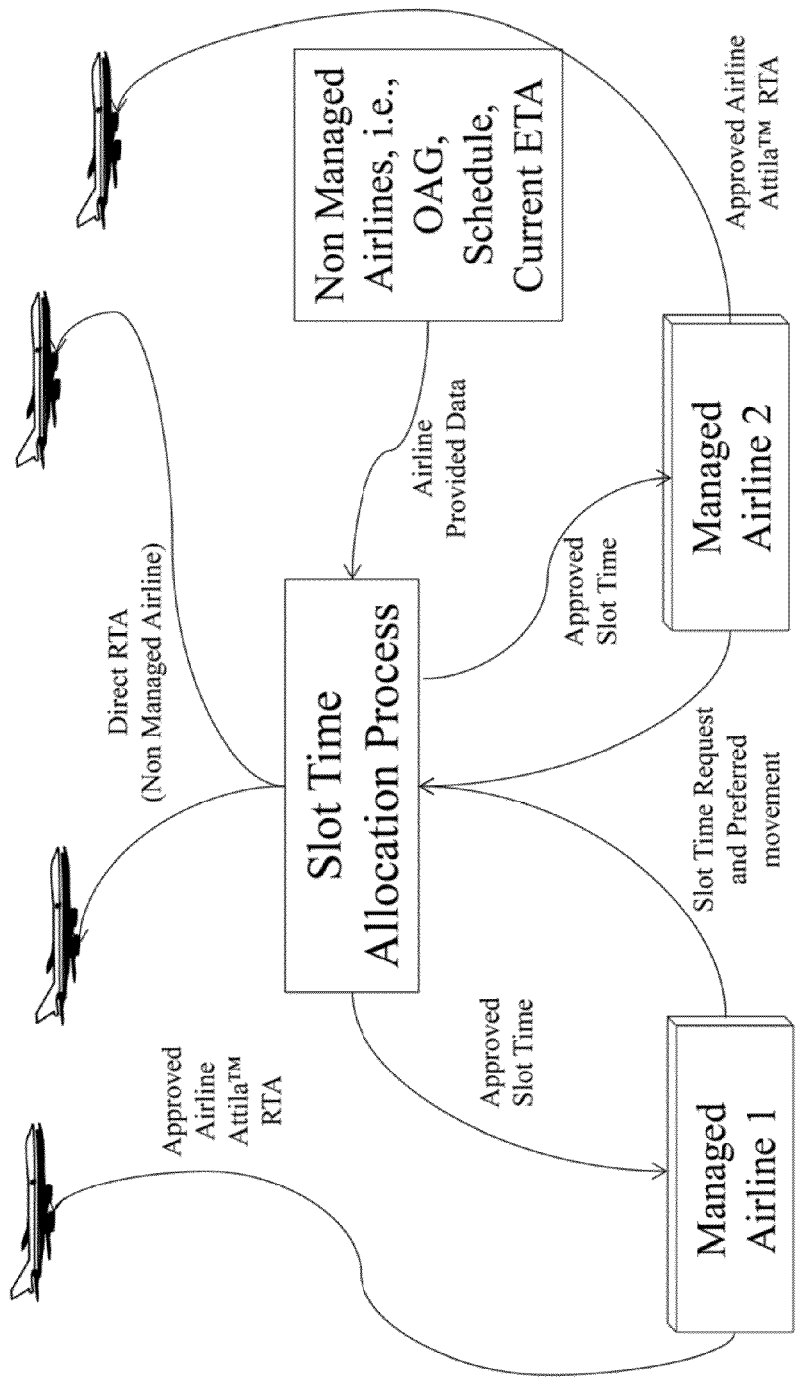
Fig. 18–Sample Process to Coordinate Arrival Fix Times by Multiple System Operators.

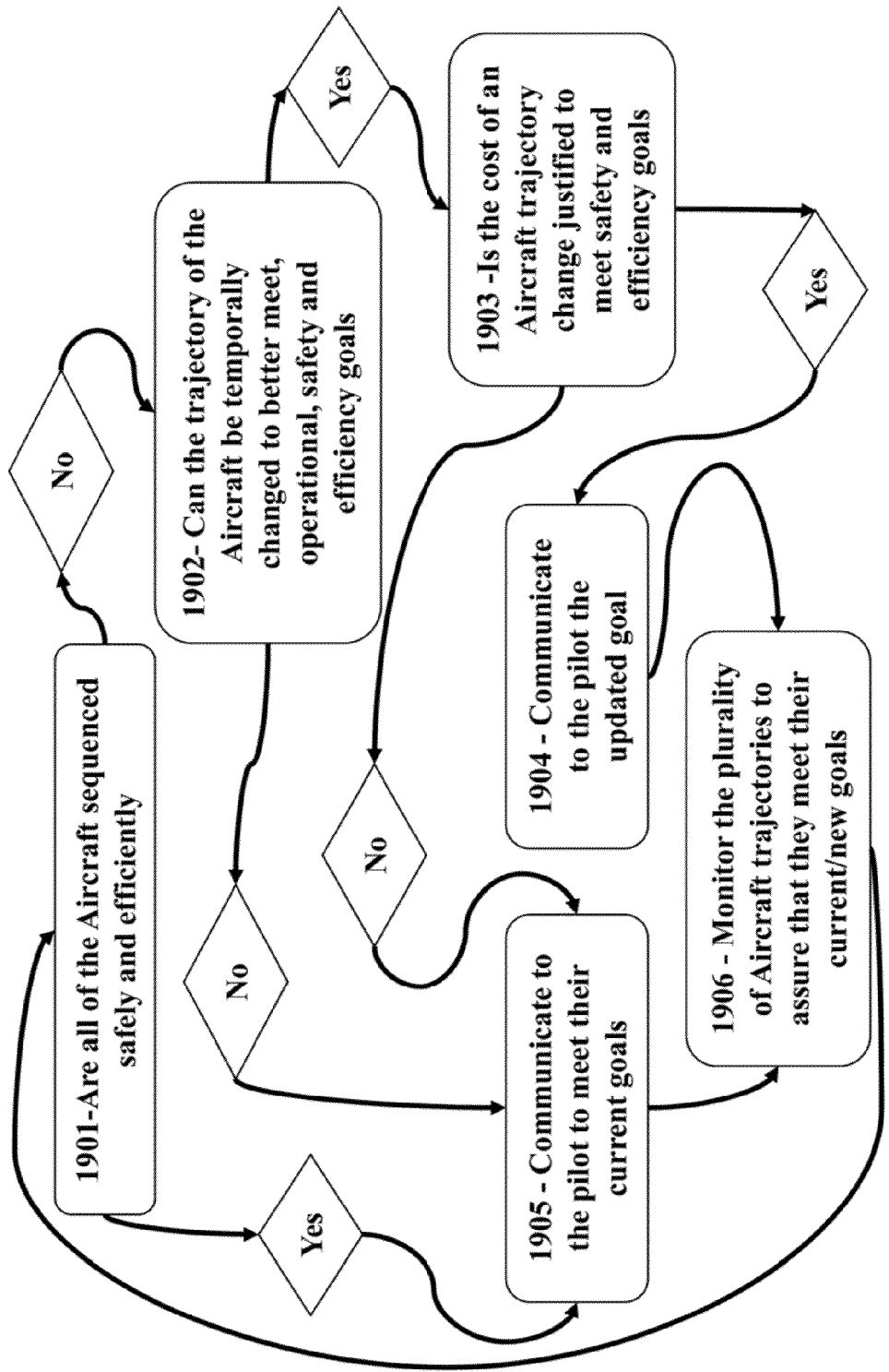
Fig. 19 - Methods of the Present Invention

METHOD AND SYSTEM FOR ALLOCATING AIRCRAFT ARRIVAL/DEPARTURE SLOT TIMES, WITH PREFERRED MOVEMENT

1. CROSS-REFERENCE TO RELATED APPLICATIONS

This application claims the benefit of U.S. Provisional Patent Application 61/688,578, filed May 17, 2012, titled "Method and System for Allocating Aircraft Arrival/Departure Times, with Preferred Movement" by R. Michael Baiada and Lonnie H. Bowlin.

Additionally, this application is related to the following U.S. Patent and Patent Applications:

U.S. Pat. No. 6,721,714 titled, "Method and System for Tactical Airline Management" issued Apr. 13, 2004. Priority date of Apr. 16, 1999, Regular application Ser. No. 09/549,074, filed Apr. 16, 2000 and entitled "Method And System For Tactical Airline Management", Provisional Application No. 60/189,223, filed Mar. 14, 2000 and entitled "Tactical Airline Management", Provisional Application No. 60/173,049, filed Dec. 24, 1999 and entitled "Tactical Airline Management", and Provisional Application No. 60/129,563, filed Apr. 16, 1999 and entitled "Tactical Aircraft Management".

U.S. Pat. No. 6,463,383 awarded Oct. 8, 2002 and entitled "Method And System For Aircraft Flow Management By Airlines/Aviation Authorities", Regular application Ser. No. 09/861,262, filed May 18, 2001 and entitled "Method And System For Aircraft Flow Management By Airlines/Aviation Authorities", Provisional Application No. 60/274,109, filed Mar. 8, 2001 and entitled "Method And System For Aircraft Flow Management By Aviation Authorities".

U.S. Pat. No. 6,789,011 titled "Method And System For Allocating Aircraft Arrival/Departure Slot Times", issued Sep. 7, 2004. Priority date Nov. 19, 2001. Regular patent application Ser. No. 10/299,640, filed Nov. 19, 2002, titled, "Method And System For Allocating Aircraft Arrival/Departure Slot Times", Provisional Application No. 60/332,614, filed Nov. 19, 2001 and entitled "Method And System For Allocating Aircraft Arrival/Departure Slot Times", U.S. Pat. No. 6,873,903 titled, "Method and System for Tracking and Prediction of Aircraft Trajectories", issued Mar. 29, 2005. Priority date of Sep. 7, 2001, Regular application Ser. No. 10/238,032, filed Sep. 6, 2002 and entitled "Method And System For Tracking And Prediction of Aircraft Trajectories", Provisional Application No. 60/317,803, filed Sep. 7, 2001 and entitled "Method And System For Tracking and Prediction of Aircraft Arrival and Departure Times".

U.S. Pat. No. 7,248,963 titled, "Method and System for Aircraft System Flow Management" issued Jul. 24, 2007. Priority date of Mar. 25, 2003. Regular application Ser. No. 10/808,970, and initial PCT application on Mar. 25, 2004 entitled, "Method and System for Aircraft Flow Management". Provisional Application No. 60/458,027, filed Mar. 25, 2003 and entitled, "Method and System for Aircraft System Flow Management by Airlines/Aviation Authorities".

U.S. Pat. No. 7,333,887 titled, "Method And System For Tactical Gate Management By Airlines/Airport/Aviation Authorities" issued Feb. 19, 2008. Priority date of Aug. 8, 2003. Regular application Ser. No. 10/913,062, filed on Aug. 6, 2004 and titled "Method And System For Tactical Gate Management By Airlines/Airport/Aviation Authorities", Provisional Application No. 60/493,494, filed Aug. 8, 2003 and titled, "Method And System For Tactical Gate Management By Airlines/Airport/Aviation Authorities".

All these applications having been submitted by the same applicants: R. Michael Baiada and Lonnie H. Bowlin. The teachings of these applications are incorporated herein by reference to the extent that they do not conflict with the teaching herein.

2. BACKGROUND OF THE INVENTION

The present invention relates to data processing and vehicle navigation. More particularly, this invention relates to methods and systems that allow one to better manage, coordinate, allocate and assign arrival/departure Slot Times for a plurality of aircraft into and out of a system resource, like an airport.

3. DESCRIPTION OF THE RELATED ART

The need for and advantages for tracking, prediction and asset allocation systems to better manage complex, multi-faceted processes have long been recognized. Many industries have known for a long time that having a certain part or set of materials at a certain place at just the right time yields significant efficiencies. Thus, many complex methods for tracking, predicting, coordinating and managing assets and material flows in real time, based on the future position of particular assets as a function of time, have been developed.

However, as applied to tracking, predicting, coordinating and managing of aircraft within the aviation industry, such methods often have been fragmentary and too early or too late in the process to effect the necessary change to provide real benefit. Additionally, these methods typically have not addressed the present and future movement of the aircraft, the business needs of the airline, aircraft operator or pilot, combined with other factors that can alter the aircraft's trajectory into/out of a system resource (e.g., airport).

Aviation regulatory authorities (e.g., various Civil Aviation Authorities, CAA, throughout the world, including the Federal Aviation Administration, FAA, within the U.S.) are responsible for matters such as the separation of moving aircraft. In this task, the CAAs collect and disseminate considerable data concerning the location of aircraft within the airspace system. This data is comprised of radar data, verbal position reports, data link position reports (ADS-B and ADS-C), etc.

Further, airlines and other aircraft operators have developed their own flight following systems as required by the world's CAM, which provide additional information concerning the position, condition and current state of their aircraft. Additionally, third parties have developed their own proprietary systems to track aircraft (e.g., Attila™, Attila Exchange™, Attila ETAT™, Passur, etc.).

In the prior art, various independent agencies, airlines or third parties use these data sources. Yet, there appears to have been few successful attempts by the various airlines/aircraft operators/CAAs/airports/military operations/third parties to develop accurate methods and processes to coordinate, manage and allocate capacity constrained resources (i.e., tactical slot allocation) that encompass most or all of the available real-time factors (weather, ATC requirements, airline business goals, individual pilot decisions, turbulence, capacity, demand, etc.) that can affect the trajectory of an aircraft.

For example, in the prior art of the management of aircraft into an airport, it often happens that the arrival sequence is established too early (prior to departure by delaying the requested departure time, i.e., FAA's Ground Delay Program) or too late (within the last 30 to 40 minutes prior to landing, i.e., FAA's Traffic Management Advisor, now renamed by FAA as Time Based Flow Management system)

in the arrival/departure process such that actions have a negative effect on the efficient use of the aircraft/runway/airport assets.

An example of one of these elements is the ATC response to too many aircraft trying to land at an airport in a defined period of time. In the prior art, the prediction of the aircraft arrival/departure Slot Time, if done at all, is not as accurate as possible since it is too late to be beneficial or predicated only based on the current pre departure flight plan. Yet, even with the wider data set available, the arrival flow system rarely uses this information in real time to temporally manage the flow of aircraft into the airport.

For example, it is only as the aircraft nears the airport, within the last 100 to 300 miles (i.e., within 30 to 40 minutes prior to landing), that the local ATC controller typically begins to manage the sequencing of the aircraft. And, even if the CAAs use this information, it is only to limit or delay the arrival flow based on distance sequencing of the flow (i.e., 20 miles nose to nose spacing) as opposed to the method of time based sequencing, using airline, aircraft operator or pilot input, embodied in the present invention. Further, by waiting so late in the arrival process to sequence the aircraft, the controller has only one sequencing option-delay.

This process is analogous to the "take a ticket and wait" approach used in other industries. To assure equitable service to all customers, as the consumer approaches a crowded counter, the vendor sets up a ticket dispenser with numbered tickets. On the wall behind the counter is a device displaying "Now Serving" and the number. This "first come, first serve" process assures that no one customer waits significantly longer than any other customer.

And while this has the desired effect in grocery stores, given the amount of data available prior to the airport arrival/departure, in the aviation business, it is a if very inefficient process when applied to the aircraft arrival/departure flow. The end result of ATC's "take a ticket and wait" approach in the prior art, as applied in a distance based manner and once the aircraft is near the destination airport or near the takeoff runway, is to add 1, 5, 10, 15 or more minutes to an aircraft's actual arrival/departure time.

Further, even if or when an arrival/departure slot is calculated and displayed to the ATC controller for their use, it is too late in the process to be efficient and the real time business needs and goals of the airline, aircraft operator or pilot are not considered. Further, a process to identify and accept an alternate Slot Time choice in real time, by the airline, aircraft operator or pilot, is not available, as encompassed within the present invention.

Only by incorporating all of the flights landing and departing at a particular airport, combined with the capacity of that airport and potential weather effects, all of which are encompassed in the present invention and readily available today, can one more accurately predict, coordinate, manage and allocate the arrival/departure Slot Times of all of the aircraft. In other words, the present invention views each aircraft as part of a system, and not individually as done within the prior art.

For example, FAA's Collaborative Decision Making (CDM) program (a system to disseminate data) took a major step forward by providing both air traffic controllers and airlines with the same real time data. However, airline dispatchers, pilots, and the local ATC controllers still act mostly independently in the use of this data and optimize complex airspace and airport situations locally. Additionally, the prior art coordination is typically a manual process, completed by telephone, typically hours prior to the arrival/departure time. Further, the competing goals of all of the different segments of the airspace and airport system (National Airspace System, i.e., NAS) often conflict, leading to confusion, variance and wasted capacity.

For another example of a real time event, a pilot may request a specific runway to save fuel and reduce taxi time even though the flight is early. If the controller tries to accommodate the request, which at many busy airports is not the case, it creates additional work, while possibly unknowingly blocking another aircraft that is already late from using the close in runway. As often as not, these aircraft are from the same airline.

Yet another example is when an ATC controller tries to sequence two aircraft within his sector for an arrival fix 400 miles down line. To do this, based on which aircraft is in the lead, the first aircraft is sped up and the trailing aircraft is slowed down or turned off course. Unfortunately, the fact that the original speeds and trajectories of each aircraft assured that the sequence 400 miles ahead at the arrival fix was not a problem was unknown to the local ATC controller.

To begin to understand how the current methods and system might be improved upon, it is first necessary to have a basic understanding of the various processes surrounding the flight of an aircraft. FIG. 1 has been provided to indicate the various segments in a typical aircraft flight process.

It begins with the filing of a flight plan by the airline/pilot with a CAA. Next, the pilot arrives at the airport, preflights the aircraft, receives the ATC route clearance, starts the engine, taxis, takes off, flies the flight plan (e.g., route of flight), lands and taxis to parking. At each stage during the movement of the aircraft on an Instrument Flight Rules (IFR) flight plan, the CAA's Air Traffic Control (ATC) system must approve the initial trajectory, and any change to the trajectory, of the aircraft. Further, anytime an aircraft on an IFR flight plan is moving, an ATC controller is responsible for ensuring that an adequate separation from other IFR aircraft is maintained.

During the last part of a flight, typical initial arrival/departure sequencing is accomplished on a first come, first serve basis (e.g., the aircraft closest to the runway or airport is first, next closest is second and so on) by the enroute ATC center near the arrival airport (within approximately 100 to 300 miles of the airport), refined by the arrival/departure ATC facility (within approximately 40 miles of the arrival/departure airport), and then approved for arrival by the local ATC tower (within approximately 5 to 10 miles of the arrival/departure airport).

For example, current CAA practices for managing arrivals at arrival/departure airports involve sequencing aircraft arrivals by linearizing an airport's traffic arrival/departure aircraft flows according to very structured, three-dimensional, aircraft arrival/departure paths, 100 to 300 miles from the airport or by holding incoming aircraft at their departure airports. For a large hub airport (e.g., Chicago, Dallas, and Atlanta), these paths involve specific geographic points that are separated by approximately ninety degrees, 30 to 50 miles from the airport (see FIG. 2).

Further, if the traffic into an airport is relatively continuous over a period of time, the linearization of the aircraft flow is can be applied hundreds of miles from landing. This can significantly restrict all the aircraft's arrival speeds and alter the expected arrival time, since all in the line of arriving aircraft are limited to the speed of the slowest aircraft in the line ahead, leading to temporal variations in the landing time.

These temporal variations in the arrival/departure Slot Times of aircraft into or out of an airport can be quite significant. FIG. 3 shows for the Dallas-Ft. Worth Airport the times of arrival at the airport's runways for the aircraft arriving during the thirty minute time period from 22:01 to 22:30. It can be seen that the numbers of aircraft arriving during the consecutive, five-minute intervals during this period were 12, 13, 6, 8, 6 and 5, respectively.

Further, much of the current thinking concerning the airline/ATC delay problem is that it stems from the over scheduling by the airlines of too many aircraft into too few runways. While this may be true in part, it is also the case that the many apparently independent, operational decisions that are made by an airline's staff (i.e., pilots, customer service agents, etc.) and various ATC controllers may significantly contribute to arrival/departure variance and airline/ATC delay problems. And while many of these decisions are predictable, in the prior art, they have yet to be accounted for and/or coordinated in real time from a system perspective.

Looking at the airline's problem from a manufacturing perspective is helpful, since, in reality, the airline "day of" operation is nothing more than relatively simple, geographically dispersed production process. Airlines take in raw materials at the front end (people, bags, fuel, food, etc.), apply numerous interdependent processes to them, and deliver a finished product to the destination curb (passenger, bag, cargo).

And since the movement of the aircraft is the primary production process, if it is unstable (which it is), nothing else can be stable. How can an airline have a good cleaning process when the cleaners are at one gate waiting for an aircraft on a 20 NM final based on when it entered the arrival queue today, while another aircraft is at a different gate screaming for cleaners? And just as Henry Ford's production line has given way to Just in Time, Supply Chain managed production lines, the current local control, piece work, linear flow of material processes must give way to a time managed arrival flow that puts the right part, in the right place, at the right time, using just the right process.

One can view the network variance problem to dumping a whole hand full of ball bearings into a funnel. Soon the narrow end gets clogged and the flow stops. The funnel must be shaken, further randomizing the flow, to get it started again. Given the huge number of independent decisions made each day (i.e., local optimization), which leads to randomness, chaos and variance, the amount of ball bearings that must be removed from the "schedule" to significantly mitigate the resultant variance is very large. In other words, depeaking on a schedule basis is not the answer.

Now consider preloading a straw with the ball bearings in the correct order (i.e., time sequenced) and then sliding that directly into the opening at the narrow end, and doing it over and over and over, as is one of the objects of the present invention as applied to the aircraft arrival/departure slots at a constrained resource like an airport.

Therefore, if the variance of the aircraft arrival flow was removed, an easier task than most would believe based on the present invention, ATC would less overloaded and aircraft could be sequenced closer to the airline's business needs. In turn, ATC could remove structure and cost, and aircraft would arrive closer to their scheduled arrival time. As the bell curve shrinks around the scheduled arrival time, airlines could lower block time (increase asset utilization), increase connections through the hub as more and more customers are delivered closer to scheduled arrival. As block time goes down, asset utilization increases and defects decrease, causing costs to go down significantly. The end result is that an airline can have higher peaked schedules and better on time performance, higher quality product produced at lower costs. Higher quality increases pricing power, thus increasing revenues. Lower costs increases competitive options.

The end result of all of this variance in the arrival/departure flow is that, once at, near or above capacity, given the random flow of aircraft (100s of independent decisions per arrival bank randomizes the flow), queuing theory shows that the arrival queue, wait time and delays rise exponentially.

These delays are especially problematic since they are seen to be cumulative. FIG. 4 shows, for all airlines and a number of U.S. airports, the percentage of aircraft arriving on time during various one-hour periods throughout a typical day. As can be seen in FIG. 4, the arrivals begin the day closer to on time, but then the on time performance deteriorates throughout the day, losing 20 to 30 percentage points.

The prior art of aircraft arrival/departure sequencing (to assure proper aircraft separation) to an airport or other system resource, can be broken down into seven distinct tools used by air traffic controllers, as applied in a first come, first served basis, and is comprised of:

1. Structured Dogleg Arrival/Departure Routes—The structured routings into an arrival/departure are typically designed with doglegs. The design of the dogleg is is two straight segments joined by an angle of less than 180 degrees. The purpose of the dogleg is to allow controllers to cut the corner or extend the arrival path as necessary to maintain the correct spacing between arrival/departure aircraft.

2. Vectoring and Speed Control—If the actual spacing between aircraft is more or less than the desired spacing, the controller can alter the speed of the aircraft to correct the spacing. Additionally, if the spacing is significantly smaller than desired, the controller can vector (turn) the trailing aircraft off the route momentarily to increase the spacing. Given the last minute nature of these actions (within 100 mile of the airport), the outcome of such actions is limited.

3. The Approach Trombone—If too many aircraft arrive at a particular airport in a given period of time, the distance between the runway and base leg can be increased; see FIG. 5. This effectively lengthens the final approach and downwind legs, allowing the controller to "store" or warehouse aircraft while in-flight.

4. Miles in Trail—If the approach trombone can't handle the over demand for the runway asset, the ATC system begins spreading out the arrival/departure aircraft linearly, with no regard for time. It does this by implementing "miles-in-trail" restrictions. Effectively, as the aircraft approach the airport for arrival/departure, instead of minimum legal separation of 5 to 10 miles between aircraft on the linear arrival/departure path, the controllers begin spacing the aircraft at 20 or more miles in trail, one behind the other; see FIG. 6.

5. Ground Holds—If the separation authorities anticipate that the approach trombone and the miles-in-trail methods will not hold the aircraft overload, aircraft are held at their departure point and metered into the system using assigned takeoff times.

6. Holding—If events happen too quickly, the controllers are forced to use airborne holding. Although this can be done anywhere in the system, this is usual done at one of the arrival/departures to an airport. Aircraft enter the "holding stack" from the enroute airspace at the top; see FIG. 7. Each holding pattern is approximately 10 to 20 miles long and 3 to 5 miles wide. As aircraft exit the bottom of the stack towards the airport, aircraft orbiting above are moved down 1,000 feet to the next level.

7. Reroute—If a section of airspace, enroute center, or airport is projected to become overloaded, the aviation authority occasionally reroutes individual aircraft is over a longer lateral route to delay the aircraft's entry to the predicted congestion.

CAAs current air traffic handling procedures are typically local in nature (100 to 300 miles from landing) and applied linearly, resulting in significant inefficiencies and delays. Thus, despite the above noted prior art, a need continues to exist for better methods and systems to coordinate, manage and allocate the arrival/departure Slot Times of a plurality of aircraft into and out of a system resource, like an airport.

4. SUMMARY OF THE INVENTION

The present invention is generally directed towards mitigating the limitations and problems identified with prior methods used to allocate arrival/departure Slot Times of aircraft. Specifically, the present invention is designed to more accurately, efficiently and safely coordinate, manage and allocate arrival/departure Slot Times for aircraft by incorporating the Requested Slot Times and Preferred Movement of the airlines, aircraft operators and pilots.

In accordance with the present invention, a preferred embodiment of this invention takes the form of a computer program product in a computer readable memory for controlling a processor to allow an airline, aircraft operator, pilot, aviation authority or other aviation entity to temporally coordinate, manage and allocate aircraft arrival/departure Slot Times during a specified period for the flow of a plurality of aircraft at a specified fix point, based upon specified data comprised of data pertaining to the aircraft, the fix point, associated system resources, business/operational goals, aviation system specified criteria, and other data, some of which is temporally varying, said computer program comprising the steps of: (1) a means of collecting and storing the specified data and criteria of an aircraft flow applicable for a specified period, at a specified fix point, (2) a means of processing, at a specified instant for which it is desired to allocate the Slot Times, the specified data applicable at that instant to each of the aircraft and associated resources so as to predict an arrival time for each of the aircraft at the specified fix point, (3) a means of assigning to each of the plurality of aircraft a Figure of Merit whose value is a measure of how likely it is that the predicted arrival fix time will be achieved by the aircraft, wherein the Figure of Merit having a specified value, which, when exceeded, implies that the predicted arrival time is sufficiently reliable so as to warrant the aircraft to be considered for an allocation of one of the Slot Times, (4) a means of accepting and storing a request by the airline, aircraft operator or pilot for a Slot Time for each of the aircraft at the specified fix point, (5) a means of accepting and storing a request from an airline, aircraft operator or pilot for an alternate Slot Time (or times) or Preferred Movement direction (i.e., forward or backward) to move the Slot Time if the Requested Slot Time is not available, (6) a means of calculating, accepting and storing Slack Time requirements, (7) a means of calculating and storing predicted Slot Times for the plurality of aircraft for which a specific Slot Time request was not made, (8) a means of calculating the demand for the Slot Times for the specified period at the specified fix point, based upon the Slot Time requests, Slack Time requirements and the predicted Slot Times for the plurality of aircraft for which a specific Slot Time request was not made, (9) a means of predicting the availability of the Slot Times for the specified period at the specified fix point, based upon specified data that is applicable for the specified period at the specified fix point, (10) a means of allocating the Slot Times through a Goal Function process, with the steps of the Goal Function process comprised of: (i) a means of evaluating the predicted unaltered Slot Time scenario of an aircraft flow applicable for the specified period and fix point against a set of specified goals, (ii) a means of comparing the request for a Slot Time by an airline, aircraft operator or pilot to determine whether a conflict exists for the Requested Slot Time, (iii) a means of assigning the Requested Slot Time to the airline, aircraft operator or pilot if no conflict for the Slot Time exists, (iv) a means of generating various alternative Slot Time assignment scenarios, using the airline, aircraft operator or pilot's Slot Time requests, the airline, aircraft operator or pilot's alternate Slot Time requests or Slot Time Preferred Movement information and a process to equitably allocate the Slot Times among all airlines, aircraft operators and pilots, if said Slot Time conflict exists, (v) a means of comparing the predicted unaltered Slot Time scenario to all of the evaluated Slot Time scenarios for the specified period and specified fix point to determine which Slot Time scenario yields the highest degree of attainment for a set of specified goals, (vi) a means of choosing the Slot Time scenario for the specified period and specified fix point which yields the highest degree of attainment for a set of specified goals, (vii) a means of assigning the Slot Times to individual aircraft for the Slot Time scenario yielding the highest degree of attainment for a set of specified goals, (viii) a means of communicating the Assigned Slot Time to the affected airline, aircraft, aircraft operator or pilot such that said affected airline, aircraft, aircraft operator or pilot has the information needed to change the aircraft trajectory to meet said targeted arrival/departure Slot Times, (11) a means that facilitates the trading of the Slot Time requests or allocated Slot Times among the airlines, aircraft operators and/or pilots, (12) a means of monitoring the ongoing temporal changes in the specified data so as to identify temporally updated specified data of an aircraft flow applicable for the specified period at the specified fix point, (13) a means of storing the updated specified data at the specified fix point, (14) a means to determine when the specified data varies beyond a specified amount, such that when the specified data varies beyond said specified amount, said computer program product takes the steps comprised of (i) a means of updating the Figure of Merit and predicted arrival fix times for each of the plurality of aircraft to which the temporally-updated specified data applies, (ii) a means of updating the predicted demand for, availability of and requests for Slot Times and Slack Times, based upon the updated specified data and specified fix times, (iii) a means of updating the Slot Time allocations based upon the updated specified data, Figure of Merit and predictions of the demand for, availability of, requests for, and updated Assigned Slot Times, (iv) a means of re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, (v) a means of communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot Times.

In another preferred embodiment, the present invention takes the form of a method to allow an airline, aviation authority or other aviation entity to temporally manage, coordinate and allocate aircraft arrival/departure Slot Times during a specified period for the flow of a plurality of aircraft at a specified fix point, based upon specified data comprised of the aircraft, the fix point, associated system resources, business/operational goals, aviation system specified criteria, and other data, some of which is temporally varying, said method comprising the steps of: (1) collecting and storing the specified data and criteria of an aircraft flow applicable for a specified period, at a specified fix point, (2) processing, at a specified instant for which it is desired to allocate the Slot Times, the specified data applicable at that instant to each of the aircraft and associated resources so as to predict an arrival time for each of the aircraft at the specified fix point, (3) assigning to each of the plurality of aircraft a Figure of Merit whose value is a measure of how likely it is that the predicted arrival fix time will be achieved by the aircraft, wherein the Figure of Merit having a specified value, which, when exceeded, implies that the predicted arrival time is sufficiently reliable so as to warrant the aircraft to be considered for an allocation of one of the Slot Times, (4) accepting and storing a request by the airline, aircraft operator or pilot for a Slot Time for each of the aircraft at the specified fix point, (5) accepting and storing a request from an airline, aircraft operator or pilot for an alternate Slot Time (or times) or Preferred Movement direction (i.e., forward or backward) to move the Slot Time if the Requested Slot Time is not available, (6) calculating, accepting and storing Slack Time requirements, (7) calculating and storing predicted Slot Times for the plurality of aircraft for which a specific Slot Time request was not made, (8) calculating the demand for the Slot Times for the specified period at the specified fix point, based upon the Slot Time requests, Slack Time requirements and the predicted Slot Times for the plurality of aircraft for which a specific Slot Time request was not made, (9) predicting the availability of the Slot Times for the specified period at the specified fix point, based upon specified data that is applicable for the specified period at the specified fix point, (10) allocating the Slot Times through a Goal Function process, with the steps of the Goal Function process comprised of (i) evaluating the predicted unaltered Slot Time scenario of an aircraft flow applicable for the specified period and fix point against a set of specified goals, (ii) comparing the request for a Slot Time by an airline, aircraft operator or pilot to determine whether a conflict exists for the Requested Slot Time, (iii) assigning the Requested Slot Time to the airline, aircraft operator or pilot if no conflict for the Slot Time exists, (iv) generating various alternative Slot Time assignment scenarios, using the airline, aircraft operator or pilot's Slot Time requests, is the airline, aircraft operator or pilot's alternate Slot Time requests or Slot Time Preferred Movement information and a process to equitably allocate the Slot Times among all airlines, aircraft operators and pilots, if said Slot Time conflict exists, (v) comparing the predicted unaltered Slot Time scenario to all of the evaluated Slot Time scenarios for the specified period and specified fix point to determine which Slot Time scenario yields the highest degree of attainment for a set of specified goals, (vi) choosing the Slot Time scenario for the specified period and specified fix point which yields the highest degree of attainment for a set of specified goals, (vii) assigning the Slot Times to individual aircraft for the Slot Time scenario yielding the highest degree of attainment for a set of specified goals, (viii) communicating the Assigned Slot Time to the affected airline, aircraft, aircraft operator or pilot such that said affected airline, aircraft, aircraft operator or pilot has the information needed to change the aircraft trajectory to meet said targeted arrival/departure Slot Times, (11) facilitating the trading of the Slot Time requests or allocated Slot Times among the airlines, aircraft operators and/or pilots, (12) monitoring the ongoing temporal changes in the specified data so as to identify temporally updated specified data of an aircraft flow applicable for the specified period at the specified fix point, (13) storing the updated specified data at the specified fix point, (14) determining when the specified data varies beyond a specified amount, such that when the specified data varies beyond said specified amount, said method takes the steps comprised of: (i) updating the Figure of Merit and predicted arrival fix times for each of the aircraft to which the temporally-updated specified data applies, (ii) updating the predicted demand for, availability of and requests for Slot Times and Slack Times, based upon the updated specified data and specified fix times, (iii) updating the Slot Time allocations based upon the updated specified data, Figure of Merit and predictions of the demand for, availability of, requests for, and updated Assigned Slot Times, (iv) re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, (v) communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot Times.

In accordance with another preferred embodiment, the present invention takes the form of a system, including a processor, memory, display and input device to allow an airline, aviation authority or other aviation entity to temporally manage, coordinate and allocate aircraft arrival/departure Slot Times during a specified period for the flow of a plurality of aircraft at a specified fix point, based upon specified data comprised of the aircraft, the fix point, associated system resources, business/operational goals, aviation system specified criteria, and other data, some of which is temporally varying, comprising the steps of the means for achieving each of the process steps listed in the above methods.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

5. OBJECTS AND ADVANTAGES

To better understand the invention disclosed herein, it is instructive to consider the objects and advantages of the present invention.

It is an object of the present invention to temporally manage the flow of aircraft through the allocation of arrival/departure Slot Times earlier in the arrival aircraft flow, using a wider set of available data, rather than through the application of linear, distance-based sequencing or limited time management, late in the arrival/departure flow, using limited data or by temporally denying access to the entire system.

It is another object of the present invention to allow airlines, aircraft operators and pilots to provide their Slot Time Request and Preferred Movement of their arrival/departure Slot Time if the arrival/departure Slot Time Request is not available.

It is another object of the present invention to build a computer program, method and/or system where airlines, aircraft operators and pilots can request, claim, alter, exchange, etc. arrival/departure Slots Times in real time.

It is yet another object of the present invention to provide a computer program, method and/or system to better allocate aircraft arrival/departure Slot Times for x hours into the future (i.e., 1 to 24 hours), with respect to a plurality of aircraft at a specified system resource, comprised of arrival/departure fixes, runways, airports, airways, airspace, ATC sector or set of resources, thereby overcoming the limitations of the prior art described herein.

It is still another object of the present invention to present a computer program, method and/or system for the real time tracking and prediction of aircraft that takes into consideration a wider array of real time parameters and factors that heretofore were not considered. For example, such parameters and factors may be comprised of aircraft related factors (e.g., speed, fuel, altitude, route, turbulence, winds, weather), ground services (gates, maintenance requirements, crew availability, etc.) and common asset availability (e.g., runways, airspace, Air Traffic Control (ATC) services), temporally varying positions and trajectories of said aircraft, the temporally varying weather conditions surrounding said aircraft and resource, the flight handling characteristics of said aircraft, the safety regulations pertaining to said aircraft and resource, the position, demand and capacity of said resource.

It is a further object of the present invention to provide a computer program, method and/or system that will enable the airlines, aircraft operators and pilots to better manage their aircraft.

It is a still further object of the present invention to provide a computer program, method and/or system to temporally allocate the arrival/departure Slot Times of aircraft into or out of a specific system resource in real time. Further, if the outcome of events alters demand or capacity for that system resource, it is then the object of the present invention to account for these problems in the arrival/departure allocations within the present invention such that arrival/departure Slot Times are reallocated forward and backward in time so as to more efficiently use the constrained resource.

It is a still further object of the present invention to monitor the temporally vary conditions and specified data to evaluate, assign and communicate alternative Slot Time scenarios if the initial Slot Time assignments become less valuable.

It is a still further object of the present invention to allocate the arrival/departure Slot times early enough in the process to allow efficient aircraft movement forward in time so as to pull the arrival queue forward into unused capacity.

These and other objects and advantages of the present invention will become readily apparent, as the invention is better understood by reference to the accompanying drawings and the detailed description that follows.

6. BRIEF DESCRIPTION OF THE DRAWINGS

FIG. 1 presents a depiction of a typical aircraft flight process.

FIG. 2 illustrates typical arrival/departure paths to and from a busy airport.

FIG. 3 illustrates an arrival/departure bank of aircraft at Dallas/Ft. Worth airport collected as part of NASA's CTAS project.

FIG. 4 illustrates the December 2000, on-time arrival/departure performance at sixteen specific airports for various one hour periods during the day.

FIG. 5 presents a depiction of the arrival/departure trombone method of sequencing aircraft.

FIG. 6 presents a depiction of the miles-in-trail method of sequencing aircraft.

FIG. 7 presents a depiction of the airborne holding method of sequencing aircraft.

FIG. 8 illustrates the various types of data that are used in the process of the present invention.

FIG. 9 illustrates the difference between a random arrival/departure aircraft flow (line 1) versus the expected ATC response to such arrival/departure flow (line 2—prior art) and a time sequenced aircraft flow with allocated fix Slot Times (line 3—present invention).

FIG. 10 illustrates a typical aircraft arrival/departure demand versus available IFR and VFR capacity at a typical hub airport. The graph is broken down into 15-minute blocks of time.

FIG. 11 illustrates a typical airline production process.

FIG. 12 illustrates the flow of data within the present invention

FIG. 13 illustrates an example of the present invention that allows for actively and passively reserving arrival/departure slots at a constrained resource.

FIGS. 14a-14e illustrates an airline, aircraft operator or pilot & Aviation Authority Aircraft Arrival/Departure Slot Time Requirement/Capacity Matrix.

FIGS. 15a-15b illustrates an example of the present invention's slot allocation processing sequence.

FIG. 16 illustrates an example of a single-aircraft Goal Function component for two aircraft.

FIG. 17 illustrates a second example of a single-aircraft Goal Function component for two aircraft.

FIG. 18 Illustrates an embodiment of the process to coordinate arrival fix Slot Times by multiple airlines or system operators FIG. 19—illustrates a sample method of the present invention.

7. DEFINITIONS

ACARS—ARINC Communications Addressing and Reporting System is a discreet data link system between the aircraft and ground personnel. This provides basic email capability between the aircraft and ground personnel, along with allowing the aircraft automatic access to send limited sets of operational data to the ground. Examples of available operational data is comprised of aircraft speed/position, weather data, airport data, OOOI data, etc.

Aircraft Situational Data to Industry (ASDI)—This an acronym for a real time data source (approximately 1 to 5 minute updates) provided by the Federal Aviation Administration, comprised of the aircraft position and intent for the aircraft flying over the United States and beyond.

Aircraft Trajectory—The movement or usage of an aircraft defined as a position and time (past, present or future). For example, the trajectory of an aircraft is depicted as a position, altitude, time and intent. This trajectory can be comprised of in-flight positions, as well as taxi positions, and even parking at a specified gate or parking spot.

Airline—a business entity engaged in the transportation of passengers, bags and cargo on an aircraft.

Airline Arrival Bank—A component of a airline's operation where numerous aircraft, owned by the airline, arrive at a specific airport (hub airport), transfer their passengers and then depart within in a very short time frame.

Airline Departure Bank—A component of an airline's operation where numerous aircraft, owned by the airline, depart from a specific airport (hub airport) within a very short time frame.

Airline Gate—An area or structure where aircraft owners/airlines park their aircraft for the purpose of loading and unloading passengers and cargo.

Air Traffic Control System (ATC)—A system to assure the safe separation of moving aircraft operated by an aviation regulatory authority. In numerous countries, the Civil Aviation Authority (CAA) manages this system. In the United States the federal agency responsible for this task is the Federal Aviation Administration (FAA).

Arrival/Departure Times—Refers to the time an aircraft was, or will be at a certain point along its trajectory. While the arrival/departure time at the gate is commonly the main point of interest for most aviation entities and airline customers, the arrival/departure time referred to herein can refer to the arrival/departure time at or from any point of interest along the aircraft's present or long trajectory.

Arrival/departure fix—At larger airports, the aviation regulatory authorities have instituted structured arrival/departure points that force all arrival/departure aircraft over geographic points (typically four for arrivals called arrival fixes and four or more for departures—see FIG. 2). These are typically 30 to 50 miles from the arrival/departure airport and are separated by approximately 90 degrees. The purpose of these arrival/departure points or cornerposts is so that the controllers can better linearly sequence the aircraft, while keeping them separate from the other arrival/departure aircraft flows. In the future it may be possible to move these merge points closer to the airport, or eliminate them all together. As described herein, the arrival/departure fix is typically a point where aircraft merge, but as referred to herein can mean any specified point along the aircraft's trajectory. Additionally, as referred to herein, an arrival/departure fix can refer to entry/exit points to any system resource, e.g., a runway, an airport gate, a section of airspace, a CAA control sector, a section of the airport ramp, etc. Refers also to a cornerpost. Further, an arrival/departure fix/cornerpost can represent an arbitrary point in space where an aircraft is or will be at some past, present or future time.

Asset—Comprised of aircraft, airports, runways, and airspace, flight jetway, gates, fuel trucks, lavatory trucks, and other labor assets necessary to operate all of the aviation assets.

Assigned Slot Time—an assigned time over a specified location that is communicated to the airline, aircraft operator or pilot. May be expressed as a Required Time of Arrival (RTA) or target speed/Mach.

Automatic Dependent Surveillance (ADS)—A data link surveillance system. This system, which is installed on the aircraft, captures the aircraft position and then communicates it to the CAA/FAA, other aircraft, etc.

Automatic Dependent Surveillance—Broadcast (ADS-B)—ADS-B is a Surveillance technique that relies on aircraft or airport vehicles broadcasting their identity, position and other information derived from on board systems (GPS, etc.). This signal can be captured for surveillance purposes on the ground (ADS-B Out) or on board other aircraft (ADS-B In). The latter will enable airborne traffic situational awareness (ATSAW), spacing, separation and self-separation applications.

Automatic Dependent Surveillance-Contract (ADS-C)—ADS-C is a contract between a ground system and the aircraft such that the aircraft will automatically provide information obtained from its own on-board sensors, and pass this information to the ground system under specific circumstances dictated by the ground system (except in emergencies).

Aviation Authority—Also aviation regulatory authority. This is the agency responsible for aviation safety along with the separation of aircraft when they are moving. In the US, this agency is the Federal Aviation Administration (FAA). In numerous other countries, it is referred to as the Civil Aviation Authority (CAA). Typically, this is a government-controlled agency, but a recent trend for the separation of aircraft is to privatize this function.

Block Time—The time from aircraft gate departure to aircraft gate arrival. This can be either scheduled block time (scheduled departure time to scheduled arrival/departure time as posted in the airline schedule) or actual block time (time difference between when the aircraft door is closed and the brakes are released at the departure station until the brakes are set and the door is open at the arrival station).

CAA—Civil Aviation Authority. As used herein is meant to refer to any aviation authority responsible for the safe separation of moving aircraft, including the FAA within the US.

Cooperative Decision-Making (CDM)—A manual program between FAA and the airlines wherein the airlines provide the FAA a more realistic real time schedule of their aircraft. Airlines and FAA also hold telephone calls each day to discuss that day's operation and problems. For example if an airline cancels 20% of its flights into a hub because of bad weather, it would advise the FAA. In turn, the FAA compiles the data and redistributes it to all participating members.

Common Assets—Assets that must be utilized by all of the airspace/airport/runway users and which are usually controlled by the aviation authority (e.g., CAA, FAA, airport). These assets (e.g., runways, ATC system, airspace, etc.) are not typically owned by any one airspace user.

CTAS—Center Tracon Automation System—This is a NASA developed set of tools (TMA, FAST, etc.) that seeks to temporally track and manage the flow of aircraft from approximately 150 miles from the airport to arrival/departure.

Federal Aviation Administration—The government agency within the United States responsible for the safe separation of aircraft while they are moving in the air or on the ground.

Figure of Merit (FOM)—A method of evaluating the accuracy of a piece of data, data set, calculation, etc. It also is a method to represent the confidence, i.e. degree of certainty; the system has in the data, trajectory and/or prediction.

Fix or Fix Point—geographic point along the aircraft trajectory. Examples could be arrival fix, cornerpost, runway, taxi way, gate, etc., with which an altitude may or may not be associated.

Four-dimensional Path—The definition of the movement of an object in one or more of four dimensions—x, y, z and time.

Goal Function—a method or process of measurement of the degree of attainment for a set of specified goals. A method or process to evaluate the current scenario against a set of specified goals and generate various alternative scenarios. Then, using all of the available generated scenarios, identify which of these scenarios will yield the highest degree of attainment for a set of specified goals. The purpose of the Goal function is to find a solution that "better" meets the specified goals (as defined by the operator) than the present condition and determine if it is worth (as defined by the operator) changing to the "better" condition/solution. This is always true, whether it is the initial run or one generated by the monitoring system. In the is case of the monitoring system (and this could even be set up for the initial condition/solution as well), it is triggered by some defined difference (as defined by the operator) between how well the present condition meets the specified goals versus some "better" condition/solution found by the present invention. Once the Goal function finds a "better" condition/solution that it determines is worth changing to, a process translates said "better" condition/solution into some doable task and then communicates this to the interested parties, and then monitors the new current condition to determine if any "better" condition/solution can be found and is worth changing again.

Hub Airline—An airline operating strategy whereby passengers from various cities (spokes) are funneled to an interchange point (hub) and connect to flight to various other cities. This allows the airlines to capture greater amounts of traffic flow to and from cities they serve, and offers smaller communities one-stop access to literally hundreds of nationwide and worldwide destinations. Also a network airline.

IFR—Instrument Flight Rules. A set of flight rules wherein the pilot files a flight plan with the aviation authorities responsible for separation safety. Although this set of flight rules is based on instrument flying (e.g., the pilot references the aircraft instruments) when the pilot cannot see at night or in the clouds, the weather and the pilot's ability to see outside the aircraft are not a determining factors in IFR flying. When flying on a IFR flight plan, the aviation authority (e.g., ATC controller) is responsible for the separation of the aircraft when it moves.

Long-Trajectory—The ability to look beyond the current flight segment to build the trajectory of an aircraft or other aviation asset (i.e., gate) for x hours (typically 24) into the future. This forward looking, long-trajectory may be comprised of numerous flight segments for an aircraft, with the taxi time and the time the aircraft to is parked at the gate as part of this trajectory. For example, given an aircraft's current position and other factors, it is predicted to land at ORD at 08:45, be at the gate at 08:52, depart the gate at 09:35, takeoff at 09:47 and land at DCA at 11:20 and be at the DCA gate at 11:31. At each point along this long trajectory, numerous factors can influence and change the trajectory. The more accurately the present invention can predict these factors, the more accurately the prediction of each event along the long trajectory. Further, within the present invention, the long-trajectory is used to predict the location of an aircraft at any point x hours into the future.

OOOI—A specific aviation data set comprised of; when the aircraft departs the gate (Out), takes off (Off), lands (On), and arrives at the gate (In). These times are typically automatically sent to the airline via the ACARS data link, but could be collected in any number of ways.

PASSUR—A passive surveillance system usually installed at the operations centers at an airport by the airline or airport. This proprietary device allows the airline's operational people on the ground to display the airborne aircraft in the vicinity (up to approximately 150 miles) of the airport where it is installed. This system has a local capability to predict landing times based on the current flow of aircraft, thus incorporating a small aspect of the ATC prediction within the present invention.

Preferred Movement—information provided by the airline, aircraft operator or pilot about the Preferred Movement (forward or backward) of the Requested Slot Time if a conflict exists for the Requested Slot Time. See Slot Time Movement.

Requested Slot Time—Requested Slot Time or Required Time of Arrival. This is a time request by an airline, aircraft operator or pilot for their aircraft, or other component in the system, to be at a specified location at the Requested time. See also Requested Slot Time.

Requested Slot Time or Slot Time Request—a request by an airline, aircraft operator or pilot for a specific Slot Time.

Required Time of Arrival (RTA). This is sent to an aircraft or other component in the system to provide direction as to the time that the aircraft or asset should be at a specified location.

Slack Time—an open, yet unavailable Slot Time deemed necessary for the optimal aircraft flow.

Slot Time—a time over a specified location that is assigned or open and potentially available for use, i.e., a requested or assigned time for an aircraft, or other system component, to be at a specified location at a specified time.

Slot Time Movement—information provided by the airline, aircraft operator or pilot about the Preferred Movement (forward or backward) of the Requested Slot is Time if a conflict exists for the Requested Slot Time. See Preferred Movement.

Strategic Tracking—The use of long range information (current time up to "x" hours into the future, where "x" is defined by the operator of the present invention, typically 1 to 24 hours) to determine Estimated Time of Arrival (ETA), demand and certain choke points in the airspace system along with other pertinent data as this information relates to the trajectory of each aircraft to better predict multi segment arrival/departures times for each aircraft.

System Resource—a resource like an airport, runway, gate, ramp area, or section of airspace, etc, that is used by all aircraft. A constrained system resource is one where demand for that resource exceeds capacity. This may be an airport with 70 aircraft that want to land in a single hour, with arrival/departure capacity of 50 aircraft per hour. Or it could be an airport with 2 aircraft wanting to land at the same exact time, with capacity of only 1 arrival/departure at a time. Or it could be a hole in a long line of thunderstorms that many aircraft want to utilize. Additionally, this can represent a group or set of system resources that can be tracked and predicted simultaneously. For example, an arrival/departure cornerpost, runaway and gate represent a set of system resources that can be tracked and predictions made as a combined set of resources to better predict the arrival/departure times of aircraft Tactical Tracking—The use of real time information (current time up to "n1" minutes into the future, where "n1" is defined by the operator of the present invention, typically 30 to 40 minutes) to predict single segment arrival/departure times for each aircraft.

TMA—FAA's Traffic Management Advisor that provides ATC controllers arrival coordinated times for the last 30 to 40 minutes prior to landing.

Trajectory—See aircraft trajectory and four-dimensional path above.

VFR—Visual Flight Rules. A set of flight rules wherein the pilot may or may not file a flight plan with the aviation authorities responsible for separation safety. This set of flight rules is based on visual flying (e.g., the pilot references visual cues outside the aircraft) and the pilot must be able to see and cannot fly in the clouds. When flying on a VFR flight plan, the pilot is responsible for the separation of the aircraft when it moves.

8. DESCRIPTION OF THE PREFERRED EMBODIMENT

Before explaining at least one embodiment of the present invention in detail, it is to be understood that the invention is not limited in its application to the arrangements of the component parts, method, system or process steps set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to methods for more accurately, efficiently and safely managing, coordinating and allocating arrival/departure Slot Times for a plurality of aircraft into or out of an aviation system resource, like an airport. For ease of understanding, the following description is based on the allocation of a single aircraft's Slot Time at an arrival fix near an airport.

In a preferred embodiment, an aircraft's arrival time slot is allocated by the present invention, earlier in the arrival flow, based upon consideration of specified data regarding many factors that are comprised of: the aircraft position, aircraft performance, capacity of the airport and arrival/departure paths, environmental factors, predicted ATC actions, airline and pilot requirements, the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

Several, seemingly independent, computer programs, methods, system, process tasks or steps may be involved in the present invention's allocation of Slot Times. These steps are comprised of:

(a) An asset trajectory tracking (e.g., three spatial directions and time) process that monitors the position and status of all aircraft and other assets of the system, (b) An asset current trajectory predicting process that predicts for the time period comprised of the current flight segment the asset's future position or usage and status, (c) A long trajectory management process that generates/allocates arrival/departure fix times for each aircraft's current and follow-on flight segments, (d) An environmental impact evaluation process that predicts how environmental factors (weather, turbulence, etc.) will alter the initial aircraft arrival/departure Slot Times and then directs that any necessary trajectory changes be made so that allocated Slot Times can be met, or, if this is not possible, suggests alternative Slot Times that most efficiently and effectively utilize the system's resources/assets, (e) A capacity identification and calculation process that looks at all of the system resources and other airspace related assets to determine availability of said assets so that allocated Slot Times can be met, or, if this is not possible, initiates action that leads to the identification of alternative Slot Times that most efficiently and effectively utilize the system's resources/assets, (f) An ATC impact assessment process that looks at all of the arriving/departing aircraft, airport capacity versus demand and other airspace related issues and predicts how expected ATC actions will impact the aircrafts' ability to meet Slot Times, or, if this is not possible, initiates action that leads to the identification of alternative Slot Times that most efficiently and effectively utilize the system's resources/assets, (g) A validation and approval process, which entails an airline/CAA or other system operator validating the practicality and feasibility of the predicted arrival/departure fix times, (h) A Slot Time request process that provides Slot Time requests and Preferred Movement, (i) A Slot Time generation process that looks at the above processes and an airlines business needs, (j) A Slot Time approval process that accepts Slot Time requests and Preferred Movement and allocates constrained resources fairly and equitably though the use of Slot Time Assignments to all airlines (may be expressed as an RTA or speed), aircraft operators and pilots, (k) A communication process which involves an airline/CAA, other system operator or automated process communicating these assigned arrival/departure Slot Times to the aircraft and all other interested parties, and (l) A closed loop monitoring process, which involves continually monitoring the current state of the aircraft and other factors. This monitoring process measures the current state of the aircraft against their initially assigned arrival/departure Slot Times. If at anytime the actions or change in status of the specified data, aircraft or other system resource assets would change the current arrival/departure Slot Times beyond a specified value, the system operator can be notified, and/or the system can automatically be triggered, at which time more accurate arrival/departure Slot Times for the aircraft can be calculated, coordinated and communicated to all appropriate personnel.

This method is seen to avoid the pitfall of not managing arrival/departure Slot Times at all or managing arrival/departure Slot Times too late (FAA's TMA process), too early (FAA's GDP process), with limited data sets, limited or no input from airlines, aircraft operators or pilots, as is done within the prior art.

For the sake of brevity, the following explanatory discussion involves only the aircraft movement aspects into a single arrival fix. It should be understood that the present invention works as well with the arrival/departure Slot Times of aircraft into or out of any aviation system resource or set of sequentially accessed resources (e.g., airspace, runways, gates, ramps, etc.).

FIG. 8 illustrates the various types of data sets that are used in the present invention, which are comprised of: air traffic control objectives, generalized surveillance, aircraft kinematics, communication and messages, airspace structure, airspace and runway availability, user requirements (if available), labor resources, aircraft characteristics, scheduled arrival and departure times, weather, gate availability, maintenance, other assets, and safety, operational and efficiency goals, as well as specified data chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

As discussed above, in the prior art, the arrival/departure Slot Times of aircraft are random and based on numerous independent decisions, which leads to wasted system capacity. For example, FIG. 9 shows two different distributions of the same arrival flow. The first line shows the predicted unaltered Slot Times of seven aircraft at the arrival fix. Recognizing that the arrival fix can only accommodate one aircraft at a time, they must be linearized in some manner. Line two shows a typical distribution of an ATC response to line one. In line two, the aircraft are distributed in a "first come, first served" manner. Aircraft #1 and #2 are left alone, while aircraft #4 through #7 are pushed backward in time in order.

In line 3, the aircraft arrival fix times are altered by the present invention to better meet the demands of the airlines, aircraft operators and pilots, while still meeting safety and efficiency requirements. In this example, rather than applying a "first come, first served" solution as is done in the prior art, the present invention has the ability to alter the sequence based on the specified data, Requested Slot Time, Preferred Movement, etc., so as to improve the business solution of all airlines, aircraft operators and pilots. Further, not only is the arrival sequence altered, the entire arrival sequence is moved forward in time, a unique aspect of the present invention.

Moving the queue forward is possible because of the timeframe in which the present invention operates. Rather than waiting until 10 to 30 minutes prior to the arrival fix, as is typically done in the prior art, the present invention determines and implements a more optimal arrival sequence and flow 1 to 3 hours or more (up to 24 hours) prior to the arrival fix, allowing time for the business goals of the aircraft to be incorporated into the arrival flow and enough time to move the first aircraft forward in time.

FIG. 15A provides a flow diagram that represents the top level decision steps involved in the control of the aircraft approaching an airport whose operations are sought to be optimized. It denotes (step 1501A) how the present invention must first select a set of aircraft within a specified time period. In step 1502A, this method is seen to compute all of the trajectories of the aircraft.

Next, the value of the Goal Function is calculated (step 1503A).

Step 1504A optimizes all of the trajectories and Slot Time Requests to find a better value of the solution.

Next, step 1505A translates the optimized trajectories into Assigned Slot Times, and in step 1506A, facilitates the trading of the Slot Time requests or allocated Slot Times among the airlines, aircraft operators and/or pilots.

Then the present invention communicates the Assigned Slot Times in step 1507A.

Finally, the computer program, method and/or system involves monitoring the assets to determine if each of the aircraft will meet their current/new trajectory goal Assigned Slot Times (step 1508A). The computer program, method and/or system embodied in the present invention continuously monitors an analyzes aircraft from present time up to "n" hours into the future, where "n" is defined by the airline, aircraft operator, pilot, CAA, etc. The overall time frame for each analysis is typically 1 to 24 hours, and then, based on the current level of data accuracy, optimizing the arrival/departure bank and assigning Slot Times at least one to three hours into the future and then continuously monitoring the aircraft as they proceed to approach the airport. As data accuracy increases, the optimization cycle and Slot Time assignments can be done earlier, and then updated as the aircraft gets closer to the airport.

The number of slots in the data structure will be proportional to the arrival rate at the fix/airspace/airport/runway. For example, a arrival fix with an arrival rate of one aircraft per minute will have one data slot per minute or sixty for each hour. If that rate is reduced, say by flow restrictions from the aviation authority, then the number of Slot Times will be dynamically reduced using Slack Time. If the airspace is closed then no Slot Times will exist.

In one embodiment of the present invention, Slots are comprised of the following five states:

O—Open, no Requested Slot Time currently exists for this time slot,

P—Passive Requested Slot Time, the present invention is predicting a valid aircraft will take this slot even though no Requested Slot Time has been made, L—Locked, a transaction is in process on this Slot Time, and R—Reserved, an Assigned Slot Time exists for a valid aircraft for this slot.

S—Slack, an open, yet unavailable Slot Time deemed necessary for the optimal aircraft flow.

As is shown in FIG. 13, one preferred embodiment of the present invention allows for Slot Time requests to be made by the airline, aircraft operator or pilot, including the Preferred Movement (i.e., forward or backward in time) if the Requested Slot Time is not available. The Slot Time assignments of the present invention are allocated based on policy as determined by the CAA or operator of the present invention by using a Assigned Slot time, RTA or speed component instead.

In one embodiment of the present invention, only when two parties request the same slot will the over-demand resolution calculations of the present invention be exercised. And it there request for the same Slot Time by 2 airlines, aircraft operators or pilots, the present invention, if supplied by the airline, aircraft operator or pilot, would use the preferred direction (i.e., forward or backward) to move the Requested Slot Time.

For example, if Airline 1 requested an Slot Time of 12:30 PM, and a move backward request if the Slot Time was not available, and Airline 2 requested a Slot Time of 12:30 PM, and a move forward request if the Slot Time was not available, in one embodiment of the present invention, Airline 1 would be assigned 12:31 PM and Airlines 2 assigned 12:29 PM. In this way, the present invention could provide airlines, aircraft operators and pilots an Assigned Slot Time that better reflects their business and internal goals and requirements.

Slot Time requests may be made by any valid (meets Figure of Merit and other policy requirements to be classified as a valid flight) airline, aircraft operator or pilot using one of two methods. First, active Slot Time requests are made by participating airlines, aircraft operators and pilots. In one embodiment, any participating user may access the present invention on-line using a secure electronic network or other access system.

Secondly, if airlines, aircraft operators and pilots do not choose to participate, they would be assigned a Passive Slot Time requests. These are implicit Slot Time requests made by non-participating aircraft.

As part of the present invention, the present invention constantly monitors the airspace and the trajectory of every aircraft. If a valid flight, whether participating or not, is bound for the selected airspace or point in space without an active Slot Time requests, the present invention will compute an estimated time of arrival. This time will be continuously updated as the flight progresses. Once the FOM of the aircraft meets specified criteria, the present invention will assign a Passive Slot Time requests for non-participating aircraft based on the calculated estimated time of arrival at the specified point in space.

Since one embodiment of the present invention uses a multi-dimensional calculation that evaluates numerous parameters and Assigned Slot Time scenarios simultaneously, the standard, yes-no arrival/departure Slot Times chart is difficult to construct for the present invention. Therefore, a table has been included as FIG. 14 to better depict the parameters that can alter the aircraft's trajectory and the solution of the present invention.

Data Lists 1 and 2 (FIGS. 14*b* and 14*c*) are seen to involve a number of airline, aircraft operator or pilot defined parameters that contribute to determining their requirements for its aircraft's arrival/departure Slot Time.

Since it would be difficult for a non-airline operator/CAA/airport to collect the necessary data to make these decisions, one embodiment of the present invention leaves the collection and incorporation of this data into the present invention to the airline, aircraft operator or pilot. That said, it is then incumbent on the airline, aircraft operator or pilot to access the present invention to request their arrival/departure Slot Time based on their internal requirements.

In Data List 1 (FIG. 14*b*), and initially ignoring other possibly interfering factors such as the weather, other aircraft's trajectories, external constraints to an aircraft's trajectory, etc., upwards of twenty aircraft parameters must be analyzed simultaneously to calculate an optimal arrival/departure Slot Time of an aircraft. This is quite different than current business practices within the aviation industry, which is comprised of focusing arrival/departure predictions on a very limited data set (e.g., current position and speed, and possibly winds) and does not attempt to use this data to temporally alter the flow of aircraft.

In Data List 2 (FIG. 14c), an airline's local facilities at the destination airport are evaluated for their ability to meet the needs and/or wants of the individual aircraft, while also considering their possible interactions with the other aircraft that are approaching the same airport.

Finally, in Data List 3 (FIG. 14d) the authority responsible (i.e., CAA) for the safe allocation of the asset (i.e., runway) must determine the safe capacity of that asset, but the airline, aircraft operator or pilot could have this information as well, to calculate a more realistic Slot Time request.

For example, under current rules, aircraft of similar size must have three nautical miles separation between arrivals to a single runway. Further, the preceding aircraft must clear the runway before the next aircraft can land. In this example, if all of the aircraft are the same size, the safe arrival capacity of the dedicated arrival runway is approximately 50 aircraft per hour. Yet, weather can reduce this safe arrival capacity. For example, snow may slow the deceleration of the aircraft on the runway requiring longer runway occupancy times, therefore lowering capacity. The aviation authority must continually determine the safe capacity of each airspace/runway asset and assure the present invention is accurate at all times.

For hub airports, this can be a daunting task as thirty to sixty of a single airline's aircraft (along with numerous aircraft from other airlines) are scheduled to arrive at the hub airport in a very short period of time. The aircraft then exchange passengers, are serviced and take off again. The departing aircraft are also scheduled to takeoff in a very short period of time. Typical hub operations are one to one and a half hours in duration and are repeated eight to twelve times per day.

Finally, in FIG. 14e, the operator must use all of the data to find a more optimal solution to be implemented.

Once the airline, aircraft operator or pilot data set is coordinated and the airline, aircraft operator or pilot has determined their optimal arrival/departure Slot Time for each of their aircraft, they then access the present invention to request an arrival/departure Slot Time.

As described, the present invention must determine the accuracy of the trajectories. It is obvious that if the trajectories are very inaccurate, the quality of any prediction based on these trajectories will be less than might be desired. The present invention determines the accuracy of the trajectories based on an internal predetermined set of rules and then assigns a Figure of Merit (FOM) to each trajectory.

For example, if an aircraft is only minutes from arrival/departure, the accuracy of the estimated arrival/departure Slot Time is very high. There is simply too little time for any action that could alter the arrival/departure Slot Time significantly.

Conversely, if the aircraft has filed its flight plan (intent), but has yet to depart Los Angeles for Atlanta there are many actions or events that would alter the predicted arrival/departure Slot Time.

It is easily understood that the FOM for these predictions is a function of time, among other factors. The earlier in time the prediction is made, the less accurate the prediction will be and thus the lower it's FOM. The closer in time the aircraft is to arrival/departure, the higher the accuracy of the prediction, and therefore the higher its FOM. Effectively, the FOM represents the confidence the present invention has in the accuracy of the predicted arrival/departure Slot Times. Along with time, other factors in determining the FOM is comprised of validity of intent, available of wind/weather data, availability of information from the pilot, etc.

It was noted that a goal function could be use to assist in the allocation of the available Slot Times. The use of such goal functions is well known in the art of process optimization. However, when these goal functions are nonlinear functions of several variables, such as in the present case, it is not always clear how to proceed with the optimization of such functions. The following discussion is meant to help clarify this process.

While the present invention is capable of providing a linear (i.e., aircraft by aircraft optimization) solution to the optimized control of a plurality of aircraft approaching an airport, it is recognized that a multi-dimensional (i.e., optimize for the whole set of aircraft, airport assets, system resources, specified data, etc.) solution provides a better, safer and more efficient solution for the total operation of the airport, including all aspects of the arrival/departure flow. For the sake of brevity, only the aircraft movement aspects into an airport are described herein in detail. It should be understood that the present invention works as well with the flow of aircraft into or out of any aviation system resource (e.g., airspace, runways, gates, ramps, etc.)

To provide a better understanding how this goal function process' optimization routine may be performed, consider the following mathematical expression of a typical slot over demand problem in which a number of aircraft, 1 . . . n, are expected to arrive to a given point at time values $t_1 \ldots t_n$. They need to be rescheduled so that:

The time difference between two arrivals is not less than some minimum, $\Delta$;

The arrival/departure times are modified as little as possible;

Some aircraft may be declared less "modifiable" than others.

We use $d_i$ to denote the change (negative or positive) our rescheduling brings to $t_i$. We may define a goal function that measures how "good" (or rather "bad") our changes are for the whole aircraft pool as $$G_1 = \Sigma_i \|d_i/r_i\|^K$$

where $r_i$ are application-defined coefficients, putting the "price" at changing each $t_i$ (if we want to consider rescheduling the i-th aircraft "expensive", we assign it a small $r_i$, based, say, on safety, airport capacity, arrival/departure demand and other factors), thus effectively limiting its range of adjustment. The sum runs here through all values of i, and the exponent, K, can be tweaked to an agreeable value, somewhere between 1 and 3 (with 2 being a good choice to start experimenting with). The goal of the present invention is to minimize $G_1$ as is clear herein below.

Next, we define the "price" for aircraft being spaced too close to each other. For the reasons, which are obvious further on, we would like to avoid a non-continuous step function, changing its value at $\Delta$. A fair continuous approximation may be, for example, $$G_2 = \Sigma_{ij} P((\Delta - |d_{ij}|)/h)$$

where the sum runs over all combinations of i and j, h is some scale factor (defining the slope of the barrier around $\Delta$), and P is the integral function of the Normal (Gaussian) distribution. $d_{ij}$ stands here for the difference in time of arrival/departure between both aircraft, i.e., $(t_i+d_i)-(t_j+d_j)$.

Thus, each term is 0 for $|d_{ij}| >> \Delta+h$ and 1 for $|d_{ij}| << \Delta-h$, with a continuous transition in-between (the steepness of this transition is defined by the value of h). As a matter of fact, the choice of P as the Normal distribution function is not a necessity; any function reaching (or approaching) 0 for arguments <<−1 and approaching 1 for arguments >>+1 would do; our choice here stems just from the familiarity.

A goal function, defining how "bad" our rescheduling (i.e., the choice of d) is, may be expressed as the sum of $G_1$ and $G_2$, being a function of $d_1 \ldots d_n$:

$$G(d_1 \ldots d_n) = K\Sigma_i C_i d_i^2 + \Sigma_{ij} P((\Delta - |d_{ij}|)/h)$$

with K being a coefficient defining the relative importance of both components. One may now use some general numerical technique to optimize this function, i.e., to find the set of values for which G reaches a minimum. The above goal function analysis is applicable to meet many, if not all, of the individual goals desired by an airline/aviation authority.

To illustrate this optimization process, it is instructive to consider the following goal function for n aircraft:

$$G(t_1 \ldots t_n) = G_1(t_1) + \ldots + G_n(t_n) + G_0(t_1 \ldots t_n))$$

where each $G_i(t_i)$ shows the penalty imposed for the i-th aircraft arriving at time $t_i$, and $G_0$—the additional penalty for the combination of arrival times $t_1 \ldots t_n$. The latter may, for example, penalize when two aircraft take the same arrival slot.

In this simplified example we may define $$G_i(t) = a \times (t - t_S)^2 + b \times (t - t_E)^2$$

so as to penalize an aircraft for deviating from its scheduled time, $t_S$, on one hand, and from its estimated (assuming currents speed) arrival time, $t_E$, on the other.

Let us assume that for the #1 aircraft $t_s=10$, $t_e=15$, $a=2$ and $b=1$. Then its goal function component computed according to the equation above, and as shown in FIG. 16, will be a square parabola with a minimum at t close to 12 (time can be expressed in any units, let us assume minutes). Thus, this is the "best" arrival time for that aircraft as described by its goal function and disregarding any other aircraft in the system.

With the same a and b, but with $t_S=11$ and $t_E=14$, the #2 aircraft's goal function component looks quite similar; the comparison is shown in FIG. 16.

Now let us assume that the combination component is set to 1000 if the absolute value $(t_1-t_2)<1$ (both aircraft occupy the same slot), and to zero otherwise. FIG. 17 shows the goal function values for these two aircraft.

The minimum (best value) of the goal function is found at $t_1=11$ and $t_2=12$, which is consistent with the common sense: both aircraft are competing for the $t_2=12$ minute slot, but for the #1 aircraft, the $t_1=11$ minute slot is almost as good. One's common sense would, however, be expected to fail if the number of involved aircraft exceeds three or four, while this optimization routine for such a defined goal function will always find the best goal function value.

Furthermore, although the description of the current invention describes the time tracking and arrival/departure Slot Time management of aircraft to an arrival/departure fix, it just as easily tracks and manages the arrival/departure Slot Times of aircraft into or out of any system resource. These system resources may be comprised of a small path through a long line of otherwise impenetrable is thunderstorms, an ATC control sector that is overloaded, etc.

Additionally, it should be noted that the description of the tracking and prediction of the aircraft asset herein is not meant to limit the scope of the patent. For example, the present invention will just as easily identify constraints and allocate access to those constrained resources for passengers, gates, food trucks, pilots, and other air transportation work-in-process assets. All of these must be strategically and tactically tracked and the arrival/departure prediction made as soon as possible and then continuously managed in real time to operate the aviation system in the most safe and efficient manner.

This present invention avoids the pitfall of sub-optimizing particular parameters. This present invention accomplishes this by assigning weighted values to various factors that comprise all of the data sets used within the present invention.

The present invention contributes to reducing wasted runway capacity by identifying potential arrival/departure bunching or wasted capacity early in the process, typically one to three hours (or more, up to 24 hours, depending on data accuracy) before arrival such that an Slot Time can be requested and coordinated to mitigate the negative aspects of the prior art.

To better illustrate the differences between the present invention and the prior means used for managing an airline, consider the following examples:

Example 1

In the prior art, after the aircraft takes off, the enroute speed is typically left to the pilot. As depicted in FIG. 9, this leads to a random flow of aircraft as they approach the airport. Yet, as soon as the aircraft takes off at the point of departure, a more accurate prediction of the arrival time can be calculated based on the currently available data.

With this data, the airline can calculate the optimal arrival fix Slot Time based on the airline's internal needs (see FIGS. 14*a*, 14*b* and 14*c*). Once a managed airline (using U.S. Pat. No. 6,721,714 titled, "Method and System for Tactical Airline Management" issued Apr. 13, 2004 or U.S. Pat. No. 6,463,383 titled, "Method and System for Aircraft Flow Management by Airlines/Aviation Authorities", issued Oct. 8, 2002, etc.), calculates a more optimal arrival fix time, the airline can provide the present invention the airline's Requested Slot Time for that aircraft, as well as a Preferred Movement direction (i.e., forward or backward) to move the requested time if the requested time is not available.

Example 2

When weather at an airport is expected to deteriorate to the point such that the rate of arrival/departures is lowered, the aviation authorities will "ground hold" aircraft at their departure points. Ground holds hold the aircraft at the point of departure, even though the actual problem is thousands of miles away. Once allowed to depart, many pilots speed up, which increases fuel burn and costs, while negating some portion of the ground hold. Additionally, the ground hold process does not input any of the business goals or alter the random arrival flow, which is still left for the arrival ATC controller to solve within 30 to 40 minutes prior to landing at the destination airport.

Further, because of rapidly changing conditions and the difficulty of communicating to numerous aircraft that are being held on the ground, it happens that expected one to two hour delays change to 30 minute delays, and then to being cancelled altogether within a fifteen minute period. Also, because of various uncertainties, it may happen that by the time the aircraft arrives at its destination, the constraint to the airport's arrival/departure rate is long since past and the aircraft is sped up for a short period. This leads to variance, many uncertainties, unpredictable flow of aircraft at the destination and wasted available capacity. An example of this scenario occurs when a rapidly moving thunderstorm, which clears the airport hours before the aircraft, is scheduled to land.

In an embodiment of the present invention, if an airport arrival/departure rate is expected to deteriorate to the point such that the rate of arrival/departures is lowered, the present invention calculates arrival/departure Slot Times (near the arrival airport, i.e., the actual constraint) for arriving aircraft based on a large set of parameters, including the predicted arrival/departure rate. Once this reduced arrival/departure capacity is posted on the present invention, airlines can request and be assigned their Slot Time requests. In addition, the airline, aircraft operator or pilot can also request a Preferred Movement direction (i.e., forward or backward) to move the requested time if the Requested Slot Time is not available. This allows the aircraft to takeoff as the airline, aircraft operator or pilot deems necessary and fly a minimum cost routing to the destination.

As illustrated by the above example, a goal of the present invention is to manage access to the problem, not limit access to the system, thus moving the aircraft flow to a pull system instead of a push system.

Example 3

Numerous aviation delays are caused by the unavailability of a gate or parking spot. Current airline/airport practices typically assign gates either too early (e.g., months in advance) and only make modifications after a problem develops, or too late (e.g., when the aircraft lands). In an embodiment of the present invention, gate availability, as provided by the airline, aircraft operator or pilot, is integrated into the airline internal optimization process. By integrating the real time gate availability into the airline, aircraft operator or pilot's business goals and then into present invention as a Requested Slot Time that meets the internal needs of the airline, along with the Preferred Movement direction (i.e., forward or backward) to move the requested time if the requested time is not available, it becomes possible to more accurately assign a more profitable and advantageous Slot Time Example 4

Given the increased predictability of the aircraft Assigned Slot Time, the process of the present invention helps the airlines, aircraft operators and pilots to more efficiently sequence the ground support assets such as gates, fueling, maintenance, flight crews, etc.

Example 5

The current thinking is that the airline delay/congestion problem arises from airline schedules that are routinely over airport capacity. The use of the present invention works to alert the airline, CAA and/or system operator to real time capacity overloads, allowing the present invention to apply corrections in the arrival flow. One such system (U.S. Pat. No. 6,463,383 issued Oct. 8, 2002 and entitled "Method And System For Aircraft Flow Management By Airlines/Aviation Authorities" and Regular application Ser. No. 09/549,074, filed Apr. 16, 2000 and entitled "Tactical Airline Management") does this by moving aircraft both forward and backward in time from a system perspective. The present invention builds on this process by adding a method for the airline, aircraft operator or pilot to provide the present invention a preferred direction (i.e., forward or backward) to move the requested time if the requested time is not available.

Take the example of the arrival/departure demand versus capacity at a typical hub airport as shown in FIG. 10. During the day, the airport has eight arrival/departure banks that are scheduled above the airport capacity. For example, at 8:00 demand is below capacity, but by 8:30, the scheduled arrival/departure demand exceeds capacity by 9 aircraft in good weather and 17 aircraft in poor weather. And then by 9:00, demand is below capacity again. It is one embodiment of the present invention to allocate arrival/departure Slot Times to flatten the arrival bunching forward and backward in time in an intelligent manner so as to better manage this actual over capacity in real time, as opposed to the prior art which typically only has the ability to delay the aircraft as they approach the airport.

Example 6

Consider the case of aircraft flow involving a bank arrival (i.e., 30 to 50 aircraft of the same airline) plus aircraft from other airlines converging towards a single airport in a short period of time. For the sake of brevity, only three aircraft will be looked at in detail, two from the hub airline, XYZ Airlines (XYZ 1 and XYZ 2) and one aircraft from a different carrier, ABC Airlines (ABC 3). Additionally, the processes described in this example will be considered to have been handled manually.

Further, in this example, the trajectory of all three aircraft is assumed to take them over the same airport arrival cornerpost. After passing the arrival cornerpost, the three aircraft then fly the same path to the airport, where they must merge with the aircraft from the other arrival cornerposts.

Immediately after the takeoff of the three aircraft, and using the trajectory prediction calculations within the present invention, these aircraft are predicted to be at the arrival cornerpost (fix point) at 1227 for XYZ1, XYZ 2 at 1233 and ABC 1 at 1233. Here, the fix point is chosen as close to the potential arrival airport (the point of possible congestion) as possible given the structure of the ATC system and other criteria. This prediction, along with resource capacity and other specified data and criteria, is continuously updated within the present invention as the new data becomes available and is inputted.

Additionally, the present invention continuously monitors the capacity of the cornerpost and airport. Based on previous experience and other criteria, the operator of the present invention is assumed to have determined that the cornerpost capacity is one aircraft per minute. Further, it is determined that the 1230 Slot Time must be designated as slack time. This data is inputted into the present invention.

After leveling off at the cruise altitude, the updated fix point predictions now show XYZ 1 is predicted to be at the arrival cornerpost (i.e., fix point) at 1228, XYZ 2 at 1234 and ABC 1 at 1231. At this point, the Figure of Merit (FOM) for all three aircraft is calculated as being high enough to warrant the calculation of a Requested Slot Time, as well as a Preferred Movement direction (i.e., forward or backward) to move the requested time if the requested time is not available, within the present invention.

After internal calculations based on XYZ's business goals (see FIGS. 14a, 14b and 14c), the XYZ Airline has determined that XYZ should request Slot Time at 1230 for XYZ, with a forward Preferred Movement, and at 1231 for XYZ 2 with a backward Preferred Movement. Then XYZ Airline accesses the present invention with the Requested Slot Time and Preferred Movement for their aircraft. But the present invention (FIG. 13) calculates that the Slot Time at 1230 is designated as slack time, but the 1229 and 1231 Slot Times are available.

Shortly thereafter, since ABC Airlines is not an active participant of the present invention, a passive Requested Slot Time for the 1231 Slot Time is entered by the present invention based on ABC 3's predicted estimated time of arrival at the fix point of 1231.

As can be seen, there is only one Requested Slot Time at 1229 (XYZ 1 at 1230 with forward movement), but there are two requests for a Slot Time of 1231. XYZ 1 is assigned the 1229 Slot Time and, after exercising the internal process and calculations of the present invention to resolve the conflict for the Slot Time requests at 1231, ABC 3 is assigned a fix time slot of 1231 and XYZ 2 is assigned a fix time slot of 1232. This conflict resolution is based on numerous criteria that are comprised of the trajectories, Requested Slot time, Preferred Movement, additional information supplied by the airlines, equitable allocation of the resource, the specified data and criteria such as safety, efficiency, aircraft characteristics, etc., as outlined herein.

Once the Slot Times are assigned, the present invention communicates these Slot Time assignments to the airline, aircraft operator or directly to the aircraft as a RTA, speed or Mach, such that the aircraft trajectories can be altered accordingly to meet the Assigned Slot Time. In the case of the XYZ flights, the XYZ internal computer system (or Dispatcher) is notified of the arrival fix Assigned Slot Times, and then communicates the Assigned Slot Times to the pilots of XYZ 1 and XYZ 2. The pilots then alter speed (and the lateral path, if required) to meet their Assigned Slot Times.

In the case of ABC 3, a non-requesting participant, one embodiment of the present invention sends the Assigned Slot Time to the aircraft via ACARS or notifies the ATC controller of ABC 3 's Assigned Slot Time. Then the ATC controller could notify the pilot of the assigned cornerpost time or the ATC controller could alter ABC 3's trajectory to meet the cornerpost Slot Time.

Example 7

Building on the previous example, in another embodiment of the present invention, the Assigned Slot Times are posted on a easily accessible display (i.e., intranet or private internet web site), which would show Slot Time 1229 filled by XYZ 1, Slot Time 1230 as slack time, 1231 filled by ABC 3 and 1232 filled by XYZ 2. From the display, XYZ, ABC and other airlines, aircraft operators and pilots can request to trade, move, cancel or otherwise alter their aircraft's Slot Time.

Additionally, if updated data or criteria shows that any of the flights would not make their assigned Slot Time, the capacity of the cornerpost or airport is changed, etc., this data would be inputted into the present invention and the process begins again.

Example 8

Two airlines (XYZ and ABC) request the same exact Slot time at 1230 and the same Preferred movement. In one embodiment of the present invention, both airlines have the same number of flights into the specified airport, so that the equability function is set so that each of the 2 airlines managing these 2 flights receive equal treatment if a they both request the same Slot Time. In this case, the present invention gives the XYZ flight its Requested Slot Time, and the ABC flight its alternative Slot Time based on the Preferred Movement. The next time XYZ and ABC request the same exact Slot time and same Preferred Movement, in one embodiment of the present invention, the present invention gives the ABC flight its Requested Slot Time, and the XYZ flight its alternative Slot Time based on the Preferred Movement. In this scenario, the present invention would give equal treatment to both ABC and XYZ airlines giving ABC its Requested Slot Time 50% of the time and XYZ its requested Slot time the other 50% of the time when they request the same Slot Time.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

We claim:

1. A computer program product in a computer readable memory for controlling a processor to allow an airline, aviation authority or other aviation entity to temporally manage, coordinate and allocate aircraft arrival/departure Slot Times during a specified period for the flow of a plurality of aircraft at a specified fix point, based upon specified data comprised of the aircraft, the fix point, associated system resources, business/operational goals, aviation system specified criteria, some of which is temporally varying, said computer program comprising the steps of:

a means of collecting and storing the specified data and criteria of an aircraft flow applicable for a specified period, at a specified fix point, a means of processing, at a specified instant for which it is desired to allocate the Slot Times, the specified data applicable at that instant to each of the aircraft and associated resources so as to predict an arrival time for each of the aircraft at the specified fix point, a means of assigning to each of the plurality of aircraft a Figure of Merit whose value is a measure of how likely it is that the predicted arrival fix time will be achieved by the aircraft, wherein the Figure of Merit having a specified value, which, when exceeded, implies that the predicted arrival time is sufficiently reliable so as to warrant the aircraft to be considered for an allocation of one of the Slot Times, a means of accepting and storing a request by the airline, aircraft operator or pilot for a Slot Time for each of the aircraft at the specified fix point, a means of accepting and storing, a request from an airline, aircraft operator or pilot for an alternate Slot Time (or times) or Preferred Movement direction (i.e., forward or backward) to move the Slot Time if the Requested Slot Time is not available, a means of calculating, accepting and storing Slack Time requirements, a means of calculating and storing predicted Slot Times for the plurality of aircraft, for which a specific Slot Time request was not made, a means of calculating the demand for the Slot Times for the specified period at the specified fix point, based upon the Slot Time requests, Slack Time requirements and the predicted Slot Times for the plurality of aircraft for which a specific Slot Time request was not made, a means of predicting the availability of the Slot Times for the specified period at the specified fix point, based upon specified data that is applicable for the specified period at the specified fix point, a means of allocating the Slot Times through a Goal Function process, with the steps of the Goal Function process comprised of:

a means of evaluating the predicted unaltered Slot Time scenario of an aircraft flow applicable for the specified period and fix point against a set of specified goals, a means of comparing the request for a Slot Time by an airline, aircraft operator or pilot to determine whether a conflict exists for the Requested Slot Time, a means of assigning the Requested Slot Time to the airline, aircraft operator or pilot if no conflict for the Slot Time exists, a means of generating various alternative Slot Time assignment scenarios, using the airline, aircraft operator or pilot's Slot Time requests, the airline, aircraft operator or pilot's alternate Slot Time requests or Slot Time Preferred Movement information and a process to equitably allocate the Slot Times among all airlines, aircraft operators and pilots, if said Slot Time conflict exists, a means of comparing the predicted unaltered Slot Time scenario to all of the evaluated Slot Time scenarios for the specified period and specified fix point to determine which Slot Time scenario yields the highest degree of attainment for a set of specified goals, a means of choosing the Slot Time scenario for the specified period and specified fix point which yields the highest degree of attainment for a set of specified goals, a means of assigning the Slot Times to individual aircraft for the Slot Time scenario yielding the highest degree of attainment for a set of specified goals.

2. A computer program product as recited in claim 1, further comprising the steps of:

a means of communicating the Assigned Slot Time to the affected airline, aircraft, aircraft operator or pilot such that said affected airline, aircraft, aircraft operator or pilot has the information needed to change the aircraft trajectory to meet said targeted arrival/departure Slot Times.

3. A computer program product as recited in claim 2, further comprising the is steps of:

a means that facilitates the trading of the Slot Time requests or allocated Slot Times among the airlines, aircraft operators and/or pilots.

4. A computer program product as recited in claim 3, further comprising, the steps of:

a means of monitoring the ongoing temporal changes in the specified data so as to identify temporally updated specified data of an aircraft flow applicable for the specified period at the specified fix point, a means of storing the updated specified data at the specified fix point, a means to determine when the specified data varies beyond a specified amount, such that when the specified data varies beyond said specified amount, said computer program product takes the steps comprised of:

a means of updating the Figure of Merit and predicted arrival fix times for each of the aircraft to which the temporally-updated specified data applies, a means of updating the predicted demand for, availability of so and requests for Slot Times and Slack Times, based upon the updated specified data and specified fix times, a means of updating the Slot Time allocations based upon the updated specified data, Figure of Merit and predictions of the demand for, availability of, requests for, and updated Assigned Slot Times, a means of re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, a means of communicating the updated Assigned Slot Times to the affected airline, aircraft, aircraft operators or pilot such that said affected airline, aircraft, aircraft operator or pilot has the information needed to change the aircraft trajectory to meet said targeted is arrival/departure Slot Times.

5. A computer program product as recited in claim 4, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said so aircraft, the safety regulations pertaining to said aircraft and resource, the position, demand and capacity of said resource.

6. A computer program product as recited in claim 3, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

7. A computer program product as recited in claim 2, further comprising the steps of:

a means of monitoring, the ongoing temporal changes in the specified data so as to identify temporally updated specified data of an aircraft flow applicable for the specified period at the specified fix point, a means of storing the updated specified data at the specified fix point, a means to determine when the specified data varies beyond a specified amount, such that when the specified data varies beyond said specified amount, said computer program product takes the steps comprised of:

a means of updating the Figure of Merit and predicted arrival fix times for each of the aircraft to which the temporally-updated specified data applies, a means of updating the predicted demand for, availability of and requests for Slot Times and Slack Times, based upon the updated specified data and specified fix times, a means of updating the Slot Time allocations based upon the updated specified data, Figure of Merit and predictions of the demand for, availability of, requests for, and updated Assigned Slot Times, a means of re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, a means of communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot.

8. A computer program product as recited in claim 7, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

9. A computer program product as recited in claim 2, wherein said specified data is chosen from the group comprised of the temporally varying positions and trajectories of said aircraft, the Slot Time Requests and Preferred Movement of the airlines, aircraft operators and pilots, the temporally varying weather conditions surrounding, said aircraft and resource, the flight handling characteristics of said aircraft, the safety regulations pertaining to said aircraft and resource, the position, demand and capacity of said resource.

10. A computer program product as recited in claim 1, wherein said specified data is chosen from the group comprising of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

11. A method to allow an aviation system to allow an airline, aviation authority or other aviation entity to temporally manage, coordinate and allocate aircraft arrival/departure Slot Times during a specified period for the flow of a plurality of is aircraft at a specified fix point, based upon specified data comprised of the aircraft, the fix point, associated system resources, business/operational, goals, aviation system so specified criteria, some of which is temporally varying, said method comprising the steps of:
   collecting and storing the specified data and criteria of an aircraft flow applicable for a specified period, at a specified fix point,
   processing, at a specified instant for which it is desired to allocate the Slot Times, the specified data applicable at that instant to each of the aircraft and associated resources so as to predict an arrival time for each of the aircraft at the specified fix point,
   assigning, to each of the plurality of aircraft a Figure of Merit whose value is a measure of how likely it is that the predicted arrival fix time will be achieved by the so aircraft, wherein the Figure of Merit having a specified value, which, when exceeded, implies that the predicted arrival time is sufficiently reliable so as to warrant the aircraft to be considered for an allocation of one of the Slot Times,
   accepting and storing a request by the airline, aircraft operator or pilot for a Slot Time for each of the aircraft at the specified fix point,
   accepting and storing a request from an airline, aircraft operator or pilot for an alternate Slot Time (or times) or Preferred Movement direction forward or backward) to move the Slot Time if the Requested Slot Time is not available,
   calculating, accepting and storing Slack Time requirements,
   calculating and storing predicted Slot Times for the plurality of aircraft, for which a specific Slot Time request was not made,
   calculating the demand for the Slot Times for the specified period at the specified fix point, based upon the Slot Time requests, Slack Time requirements and the predicted Slot Times for the plurality of aircraft for which a specific Slot Time request was not made,
   predicting the availability of the Slot Times for the specified period at the specified fix point, based upon specified data that is applicable for the specified period, at the specified fix point,
   allocating the Slot Times through a Goal Function process, with the steps of the Goal Function process comprised of:
      is evaluating the predicted unaltered Slot Time scenario of an aircraft flow applicable for the specified period and fix point against a set of specified goals,
      comparing die request for a Slot Time by an airline, aircraft operator or pilot to determine whether a conflict exists for the Requested Slot Time,
      assigning the Requested Slot Time to the airline, aircraft operator or pilot if no conflict for the Slot Time exists,
      generating various alternative Slot Time assignment scenarios, using the airline, aircraft operator or pilot's Slot Time requests, the airline, aircraft operator or pilot's alternate Slot Time requests or Slot Time Preferred Movement information and a process to equitably allocate the Slot Times among all airlines, aircraft operators and pilots, if said Slot Time conflict exists,
      comparing the predicted unaltered Slot Time scenario to all of the evaluated Slot Time scenarios for the specified period and specified fix point to determine which Slot Time scenario yields the highest degree of attainment for a set of specified goals,
      choosing the Slot Time scenario for the specified period and specified fix point which yields the highest degree of attainment for a set of specified goals,
      assigning the Slot Times to individual aircraft for the Slot Time scenario yielding the highest degree of attainment for a set of specified goals.

12. A method as recited in claim 11, further comprising, the steps of:
   communicating the Assigned Slot Time to the affected airline, aircraft, aircraft operator or pilot such that said affected airline, aircraft, aircraft operator or pilot has the information needed to change the aircraft trajectory to meet said targeted arrival/departure Slot Times.

13. A method as recited in claim 12, further comprising the steps of:
   facilitating the trading of the Slot Time requests or allocated Slot Times among the airlines, aircraft operators and/or pilots.

14. A method as recited in claim 13, further composing the steps of:
   so monitoring the ongoing temporal changes in the specified data so as to identify temporally updated specified data of an aircraft flow applicable for the specified period at the specified fix point,
   storing the updated specified data at the specified fix point,
   determining when the specified data varies beyond a specified amount, such that when the specified data varies beyond said specified amount, said method takes the steps comprised of:
      updating the Figure of Merit and predicted arrival fix times for each of the aircraft to which the temporally-updated specified data applies,
      updating the predicted demand for, availability of and requests for Slot so Times and Slack Times, based upon the updated specified data and specified fix times,
      updating the Slot Time allocations based upon the updated specified data, Figure of Merit and predictions of the demand for, availability of, requests for, and updated Assigned Slot Times, re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot Times.

15. A method as recited in claim 14, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

16. A method as recited in claim 13, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

17. A method as recited in claim 12, further comprising the steps of:

monitoring the ongoing temporal changes in the specified data so as to identify temporally updated specified data of an aircraft flow applicable for the specified period at the specified fix point, storing the updated specified data at the specified fix point, determining when the specified data varies beyond a specified amount, such that when the specified data varies beyond said specified amount, said method takes the steps comprised of:

updating the Figure of Merit and predicted arrival fix times for each of so the aircraft to which the temporally-updated specified data applies, updating the predicted demand for, availability of and requests for Slot Times and Slack Times, based upon the updated specified data and specified fix times, updating the Slot Time allocations based upon the updated specified data, Figure of Merit and predictions of the demand for, availability of, requests for, and updated Assigned Slot Times, re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot Times.

18. A method as recited in claim 17, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

19. A method as recited in claim 12, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

20. A method as recited in claim 11, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

21. A system, including a processor, memory, display and input, device to allow an airline, aviation authority or other aviation entity to temporally manage, coordinate and allocate aircraft arrival/departure Slot Times during, a specified period for the flow of a plurality of aircraft at a specified fix point, based upon specified data comprised of the aircraft, the fix point, associated system resources, business/operational goals, aviation system specified criteria, some of which is temporally varying, said system comprising the steps of:

a means of collecting and storing the specified data and criteria of an aircraft flow applicable for a specified period, at a specified fix point, a means of processing, at a specified instant for which it is desired to allocate the Slot Times, the specified data applicable at that instant to each of the aircraft and associated resources so as to predict an arrival time for each of the aircraft at the specified fix point, a means of assigning to each of the plurality of aircraft a Figure of Merit whose value is a measure of how likely it is that the predicted arrival fix time will be achieved by the aircraft, wherein the Figure of Merit haying a specified value, which, when exceeded, implies that the predicted arrival time is sufficiently reliable so as to warrant the aircraft to be considered for an allocation of one of the Slot Times, a means of accepting and storing a request by the airline, aircraft operator or pilot for a Slot Time for each of the aircraft at the specified fix point, a means of accepting and storing a request from an airline, aircraft operator or pilot for an alternate Slot Time (or times) or Preferred Movement direction forward or backward) to move the Slot Time if the Requested Slot Time is not available, a means of calculating, accepting and storing Slack Time requirements, a means of calculating and storing predicted Slot Times for the plurality of aircraft, for which a specific Slot Time request was not made, a means of calculating the demand for the Slot Times for the specified period at the specified fix point, based upon the Slot Time requests, Slack Time requirements and the predicted Slot Times for the plurality of aircraft for which a specific Slot Time request was not made, a means of predicting the availability of the Slot Times for the specified period at the specified fix point, based upon specified data that is applicable for the specified period at the specified fix point, a means of allocating the Slot Times through a Goal Function process, with the steps of the Goal Function process comprised of:

a means of evaluating the predicted unaltered Slot Time scenario of an aircraft flow applicable for the specified period and fix point against a set of specified goals, a means of comparing the request for a Slot Time by an airline, aircraft operator or pilot to determine whether a conflict exists for the Requested Slot Time, a means of assigning the Requested Slot Time to the airline, aircraft operator or pilot if no conflict for the Slot Time exists, a means of generating various alternative Slot Time assignment scenarios, using the airline, aircraft operator or pilot's Slot Time requests, the airline, aircraft operator or pilot's alternate Slot Time requests or Slot Time Preferred Movement information and a process to equitably allocate the Slot Times among all airlines, aircraft operators and pilots, if said Slot Time conflict exists, a means of comparing the predicted unaltered Slot Time scenario to all of the evaluated Slot Time scenarios for the specified period and specified fix point to determine which Slot Time scenario yields the highest degree of attainment for a set of specified goals, a means of choosing the Slot Time scenario for the specified period and specified fix point which yields the highest degree of attainment for a set of specified goals, a means of assigning the Slot Times to individual aircraft for the Slot Time scenario yielding the highest degree of attainment for a set of specified goals.

22. A system as recited in claim 21, further comprising the steps of:

a means of communicating the Assigned Slot Time to the affected airline, aircraft, aircraft operator or pilot such that said affected airline, aircraft, aircraft operator or pilot has the information needed to change the aircraft trajectory to meet said targeted arrival/departure Slot Times.

23. A system as recited in claim 22, further comprising the steps of:

a means that facilitates the trading of the Slot Time requests or allocated Slot Times among the airlines, aircraft operators and/or pilots.

24. A system as recited in claim 23, further comprising the steps of:

a means of monitoring the ongoing temporal changes in the specified data so as to identify temporally updated specified data of an aircraft flow applicable for the specified period at the specified fix point, a means of storing, the updated specified data at the specified fix point, a means to determine when the specified data varies beyond a specified amount, such that when the specified data varies beyond said specified amount, said system takes the steps comprised of:

a means of updating the Figure of Merit and predicted arrival fix times for each of the aircraft to which the temporally-updated specified data applies, a means of updating the predicted demand for, availability of and requests for Slot Times and Slack Times, based upon the updated specified data and specified fix times, a means of updating the Slot Time allocations based upon the updated specified data, Figure of Merit and predictions of the demand for, availability of, requests for, and updated Assigned Slot Times, a means of re-identifying and re-elevating alternative scenarios to resolve conflicts for the Slot Times based upon a specified Goal function that is responsive to the requests and operator input, so as to find a Slot Time scenario yielding the highest degree of attainment for a set of specified goals, a means of communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot Times such that said affected, airline, aircraft, aircraft operator or pilot has the information needed to change the aircraft trajectory to meet said targeted arrival/departure Slot Times.

25. A system as recited in claim 24, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

26. A system as recited in claim 23, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

27. A system as recited in claim 22, further comprising the steps of:

a means of monitoring the ongoing temporal changes in the specified data so as to identify temporally updated specified data of an aircraft flow applicable for the specified period at the specified fix point, a means of storing the updated specified data at the specified fix point, a means to determine when the specified data varies beyond a specified amount, such that when the specified data varies beyond said specified amount, said system takes the steps comprised of:

a means of updating the Figure of Merit and predicted arrival fix times for each of the aircraft to which the temporally-updated specified data applies, a means of updating the predicted demand for, availability of and requests for Slot Times and Slack Times, based upon the updated specified data and specified fix times, a means of updating the Slot Time allocations based upon the updated specified data, Figure of Merit and predictions of the demand for, availability of requests for, and updated Assigned Slot Times, a means of re-identifying and re-evaluating alternative scenarios to resolve conflicts for the Slot Times based upon a specified Goal function that is responsive to the requests and operator input, so as to find a Slot Time scenario yielding the highest degree of attainment for a set of specified goals, a means of communicating the updated Assigned Slot Times to the affected airline, aircraft, aircraft operators or pilot such that said affected airline, aircraft, aircraft operator or pilot has the information needed to change the aircraft trajectory to meet said targeted arrival/departure Slot Times.

28. A system as recited in claim 27, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

29. A system as recited in claim 22, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

30. A system as recited in claim 21, wherein said specified data is chosen from the group comprised of the temporally varying positions and trajectories of said aircraft, the Slot Time Requests and Preferred Movement of the airlines, aircraft operators and pilots, the temporally varying weather conditions surrounding said aircraft and resource, the flight handling characteristics of said aircraft, the safety regulations pertaining to said aircraft and resource, the position, demand and capacity of said resource.

* * * * *